(12) United States Patent
Takada et al.

(10) Patent No.: US 10,025,757 B2
(45) Date of Patent: Jul. 17, 2018

(54) INFORMATION DISPLAY DEVICE, DELIVERY DEVICE, INFORMATION DISPLAY METHOD, AND NON-TRANSITORY COMPUTER READABLE STORAGE MEDIUM

(71) Applicant: YAHOO JAPAN CORPORATION, Tokyo (JP)

(72) Inventors: Kensuke Takada, Tokyo (JP); Soichi Tatsumi, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 28 days.

(21) Appl. No.: 14/842,251

(22) Filed: Sep. 1, 2015

(65) Prior Publication Data

US 2016/0085728 A1 Mar. 24, 2016

(30) Foreign Application Priority Data

Sep. 19, 2014 (JP) .................................. 2014-191810

(51) Int. Cl.
*G06F 17/21* (2006.01)
*G06F 17/30* (2006.01)

(52) U.S. Cl.
CPC .................................. *G06F 17/211* (2013.01)

(58) Field of Classification Search
CPC ... G06F 17/211; G06F 3/0482; G06F 3/04847
See application file for complete search history.

(56) References Cited

U.S. PATENT DOCUMENTS

| 6,912,694 | B1* | 6/2005 | Harrison | G06F 3/0485 |
| | | | | 715/784 |
| 7,428,709 | B2* | 9/2008 | Forstall | G06F 3/0485 |
| | | | | 715/784 |
| 8,266,550 | B1* | 9/2012 | Cleron | G06F 1/1633 |
| | | | | 345/173 |
| 2005/0192924 | A1* | 9/2005 | Drucker | G06F 3/0483 |

(Continued)

FOREIGN PATENT DOCUMENTS

| JP | 2013-232225 A | 11/2013 |
| JP | 5386659 B1 | 1/2014 |

(Continued)

OTHER PUBLICATIONS

Stackoverflow.com overlay divs on scroll as available Aug. 20, 2014, pp. 1-3 http://stackoverflow.com/questions/12771281/overlay-divs-on-scroll.*

(Continued)

*Primary Examiner* — Scott Baderman
*Assistant Examiner* — Mario M Velez-Lopez
(74) *Attorney, Agent, or Firm* — Oliff PLC

(57) ABSTRACT

According to one aspect of an embodiment, an information display device includes a display unit configured to display first content and second content which are individual pieces of content side by side. The information display device includes a change unit configured to changes a display range of the first content and changes the second content to third content according to a change operation of changing a display range serving as a range in which the first content is displayed on a screen.

18 Claims, 8 Drawing Sheets

(56) References Cited

U.S. PATENT DOCUMENTS

| | | | |
|---|---|---|---|
| 2008/0256470 A1* | 10/2008 | Bhogal | G06F 17/30722 715/764 |
| 2010/0095240 A1* | 4/2010 | Shiplacoff | G06F 3/0483 715/784 |
| 2012/0158537 A1* | 6/2012 | Gonsalves | G06Q 30/0631 705/26.7 |
| 2012/0278725 A1* | 11/2012 | Gordon | H04N 21/2665 715/738 |
| 2013/0176333 A1* | 7/2013 | Agar | H04N 1/00167 345/629 |
| 2013/0232148 A1* | 9/2013 | MacDonald | G06F 17/30873 707/740 |
| 2013/0311872 A1* | 11/2013 | Jokl, III | G06F 17/21 715/234 |
| 2014/0137020 A1* | 5/2014 | Sharma | G06F 3/0482 715/769 |
| 2014/0281849 A1* | 9/2014 | Siegel | G11B 27/031 715/202 |
| 2014/0317556 A1* | 10/2014 | Ellenich | G06F 3/0485 715/784 |
| 2015/0070283 A1* | 3/2015 | Irwin | G06F 3/0416 345/173 |
| 2015/0222841 A1* | 8/2015 | Kwak | H04N 5/23293 348/239 |
| 2015/0339033 A1* | 11/2015 | Arnold | G06F 3/04842 715/854 |
| 2016/0291846 A1* | 10/2016 | DeWeese | G06F 3/0482 |
| 2016/0291848 A1* | 10/2016 | Hall | G06F 3/04817 |
| 2016/0299651 A1* | 10/2016 | Karunamuni | G06F 3/0482 |

FOREIGN PATENT DOCUMENTS

| | | |
|---|---|---|
| JP | 2014-049095 A | 3/2014 |
| WO | 2014/155683 A1 | 10/2014 |

OTHER PUBLICATIONS

Jun. 2, 2015 Notice of Rejection issued in Japanese Patent Application No. 2014-191810.

Apr. 26, 2016 Office Action issued in Japanese Patent Application No. 2015-239227.

Anchor Pro, "Microsoft Office 2010, Complete Reverse Dictionary for Word 2010, 670 tips" first edition, "670 Tips to Use Word Better!" Japan, Shuwa System Co., Ltd, Kazukuni Saito, Nov. 6, 2010, first edition, p. 28.

* cited by examiner

| ADVERTISER ID | ADVERTISEMENT CONTENT | NUMBER OF IMPRESSIONS | NUMBER OF GUARANTEED IMPRESSIONS | CONSIDERATION | ... |
|---|---|---|---|---|---|
| B10 | C20, CONTROL INSTRUCTION | 10000 | 20000 | aaa | ... |
| | C50, CONTROL INSTRUCTION | 5000 | 10000 | bbb | ... |
| | C60, CONTROL INSTRUCTION | 15000 | 20000 | ccc | ... |
| | ... | ... | ... | ... | ... |
| B20 | C70, CONTROL INSTRUCTION | 10000 | 20000 | ddd | ... |
| | C80, CONTROL INSTRUCTION | 5000 | 10000 | eee | ... |
| | ... | ... | ... | ... | ... |
| ... | ... | ... | ... | ... | ... |

INFORMATION DISPLAY DEVICE, DELIVERY DEVICE, INFORMATION DISPLAY METHOD, AND NON-TRANSITORY COMPUTER READABLE STORAGE MEDIUM

CROSS-REFERENCE TO RELATED APPLICATIONS

The present application claims priority to and incorporates by reference the entire contents of Japanese Patent Application No. 2014-191810 filed in Japan on Sep. 19, 2014.

BACKGROUND OF THE INVENTION

1. Field of the Invention

The present invention relates to an information display device, a delivery device, an information display method, and non-transitory computer readable storage medium.

2. Description of the Related Art

In the past, a technique of displaying various pieces of information through an arbitrary information display device, for example, a smart device such as a smartphone or a tablet personal computer (PC) or a desktop PC, has been known. As an example of such a technique, a technique of inspiring an interest in content by causing predetermined content to be displayed on a screen of an information display device and changing a display form of content according to the user's operation has been known. For example, a technique of increasing an area for displaying content when a web page and content separate from the web page are displayed on a screen, and the user performs a web page scrolling operation has been known.

Patent Literature 1: Japanese Patent Application Laid-open No. 2014-049095

However, in the techniques of the related art described above, there are cases in which it is difficult to say that the appeal of information related to content is necessarily high. For example, in the techniques of the related art, when the web page scrolling operation is performed, an area for displaying content is only increased, and there are cases in which information related to content is not transferred to the user viewing the web page.

SUMMARY OF THE INVENTION

It is an object of the present invention to at least partially solve the problems in the conventional technology.

According to one aspect of an embodiment, an information display device includes a display unit configured to display first content and second content which are individual pieces of content side by side. The information display device includes a change unit configured to changes a display range of the first content and changes the second content to third content according to a change operation of changing a display range serving as a range in which the first content is displayed on a screen.

According to the other aspect of an embodiment, a delivery device includes a delivering unit configured to deliver second content and third content displayed with first content to a terminal device together with control information. The control information causes the terminal device to execute a display process of displaying the first content and the second content side by side, and a change process of changing a display range of the first content and changes the second content to third content according to a change operation of changing a display range serving as a range in which the first content is displayed on a screen.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
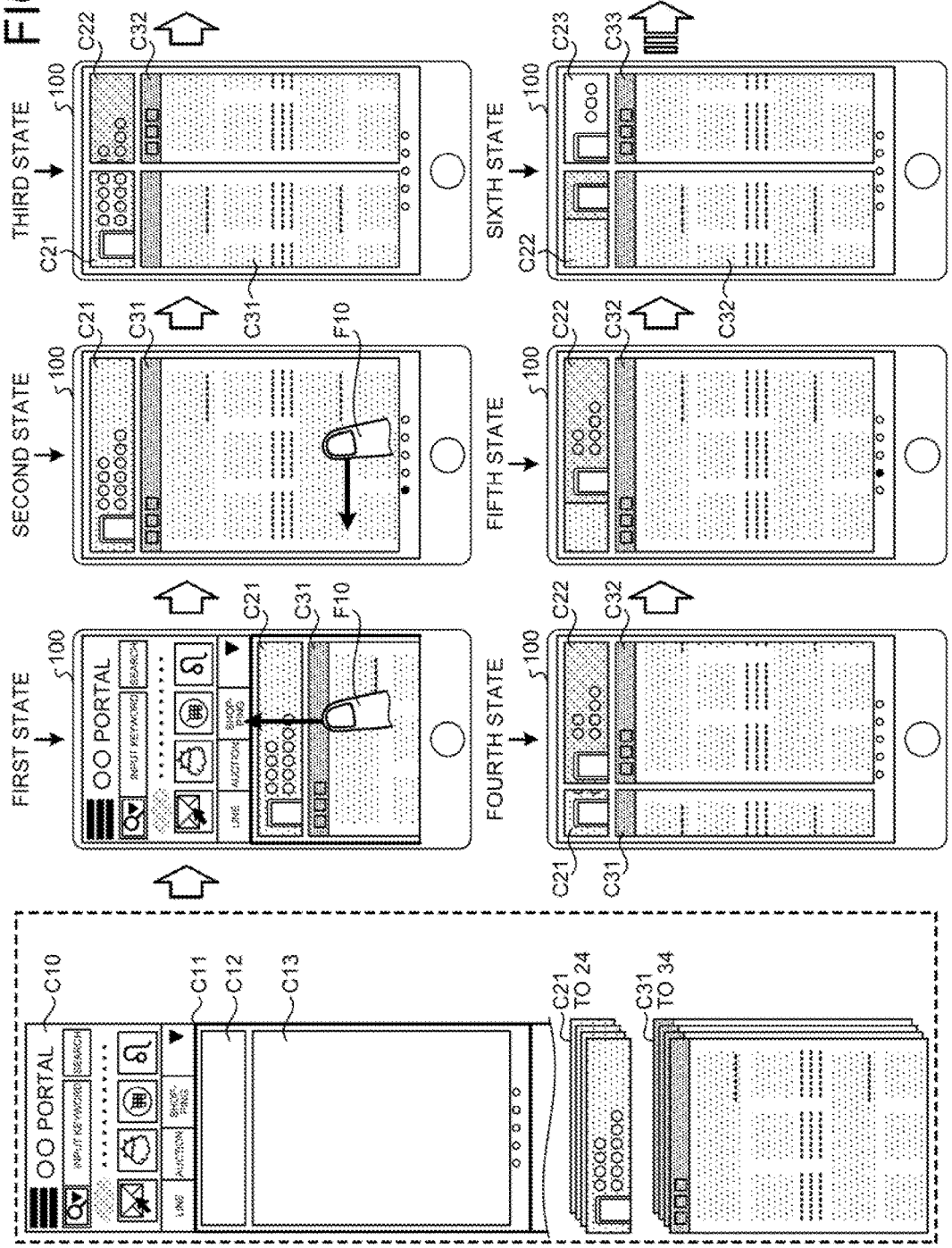
FIG. 1 is a diagram illustrating an exemplary terminal device according to according to an embodiment.

Hereinafter, a mode (hereinafter, referred to as an "embodiment") for carrying out an information display device, a delivery device, an information display method, and an information display program according to the present application will be described in detail with reference to the appended drawings. An information display device, a delivery device, an information display method, and an information display program according to the present application are not limited by the following embodiments. In the following embodiment, the same reference numerals denote the same parts, and a duplicated description thereof will be omitted.

1. Example of Terminal Device 100

First, an exemplary process executed by a terminal device 100 serving as an example of an information display device will be described with reference to FIG. 1. FIG. 1 is a diagram illustrating an exemplary terminal device according to an embodiment. FIG. 1 illustrates an example in which the terminal device 100 displays a web page C10, a plurality of pieces of content C21 to 24, and a plurality of pieces of web content C31 to C34. In the following description, a plurality of pieces of content C21 to C24 are also referred to as content C20.

The terminal device 100 illustrated in FIG. 1 is a smart device such as a smartphone or a tablet, and serves as a portable terminal device capable of performing communication with an arbitrary server device through a wireless communication network of 3rd generation (3G), Long Term Evolution (LTE), or the like. The terminal device 100 includes an output unit 130 such as a liquid crystal display (LCD). The terminal device 100 is assumed to employ a touch panel. In other words, the user of the terminal device 100 performs various kinds of operations by touching a display surface of the output unit 130 with a finger or a dedicated pen.

The web page C10 is a web page in which, for example, news, weather forecast, an index or content of a received mail, a photo viewer, and various kinds of pieces of other content are arranged, and described in a Hyper Text Markup Language (HTML) or an Extensible Markup Language (XML). In the following description, the web page C10 is assumed to be a web page of a so-called portal site. The web page C10 is a web page optimized for smart devices, and a display size of the web page C10 in a horizontal direction is assumed to be the same as a display size of a screen of the terminal device 100 in the horizontal direction. Further, a display size of the web page C10 in a vertical direction is assumed to be larger than a display size of a display of the terminal device 100 in the vertical direction.

Here, the web page C10 is content in which, for example, news, weather forecast, an index or content of a received mail, a photo viewer, and various kinds of pieces of other content are arranged in an independent tile form, and it is possible to perform an operation, an update, or the like on content arranged in a tile form. Here, a size or an arrangement position of each tile arranged on the web page C10 may be changed automatically for each tile or may be changed according to the user's operation. The web page C10 may be a web page described in a Hyper Text Markup Language (HTML), an Extensible Markup Language (XML), or the like. The web page C10 includes, for example, an input space for inputting a search keyword, a link to another web page, or the like.

The web page C10 includes an icon in which an input space for inputting a search keyword or a link to another web page such as a mailer, a weather forecast, a shopping site, or fortune-telling is set. Further, for example, a button in which a link to a web page of providing various kinds of services such as "line," "auction," and "shopping" is set is arranged on the web page C10. Furthermore, a button in which a predetermined mark (for example, a downward triangle) is arranged is arranged on the web page C10, and when the button is selected, a link to a web page of providing various kinds of other services is displayed in a pull-down manner.

Here, the web page C10 includes a tile in which a predetermined display region C11 is arranged. The predetermined display region C11 includes a display region C12 for displaying content related to an advertisement (hereinafter, also referred to as "advertisement content" and a display region C13 for displaying web content in which information such as news is arranged. Upon receiving delivery of the web page C10, the terminal device 100 transmits an advertisement content delivery request to an advertisement delivery server 20 that delivers advertisement content.

Then, upon receiving delivery of the content C20, the terminal device 100 displays the web page C10, and causes the delivered content C20 to be displayed on the display region C12 as the advertisement content from the advertisement delivery server 20. Further, the terminal device 100 acquires web content C30 from a predetermined server, and causes the acquired web content C30 to be displayed on the display region C13. In the following description, the terminal device 100 is assumed to receive delivery of the web content C30 from a content delivery server that delivers the web page C10.

The pieces of content C21 to C24 are, for example, content related to an advertisement that is displayed together with the web content C30. The pieces of content C21 to C24 are individual images that have the same display size as the display region C12 and used to transfer common information to the user. For example, the pieces of content C21 to C24 are different images but images used to transfer content of the same product or service.

The content C20 is not limited to an example illustrated in FIG. 1. For example, the content C20 is assumed to be the recruitment of volunteers, public service advertising, a public notice, a moving image, a still image, or any other content as well as an advertisement related to advertising of a product or service associated with the content C20. In other words, a text, a graphic, a sign, a hyperlink, or any other content are applicable as the content C20 along as it causes the user to have an interest and widely indicates information included in such content or information related to other content (for example, a landing page or the like) associated with relevant content.

A link to a predetermined web page (a so-called landing page) may be set to the content C20. In other words, the content C20 may be content that can transition to a predetermined landing page when the content C20 is selected by the user. For example, when an operation performed by the user satisfies a predetermined condition, the terminal device 100 displays a landing page set to the content C20. Specifically, the terminal device 100 displays a landing page corresponding to the content C20 when the user selects the display region C12 on which the content C20 is displayed in the screen of the terminal device 100. The terminal device 100 may display the content C21 to C24 to which individual landing pages are set, respectively.

The pieces of web content C31 to C34 are web content displayed on the display region C13. For example, the pieces of web content C31 to C34 are web content in which different types of news, headlines, images, moving images, or the like are arranged. In detail, for example, various kinds of pieces of content related to main news in respective fields are arranged in the web content C31, various kinds of pieces of content related to main news in a country are arranged in the web content C32, various kinds of pieces of content related to main new related to sports are arranged in the web content C33, and various kinds of pieces of content related to main news related to entertainment are arranged in the web content C34. Further, content arranged in each of the web content C31 to C34 is updated as necessary based on the number of browsing of news, a buzzword, or the like.

Upon receiving the web content C31 to C34, the terminal device 100 arranges the web content C31 to C34 in the horizontal direction, and displays the web content C31 to C34 on the display region C13. Then, when the user's finger moves in the horizontal direction within a region on the screen on which the display region C13 is displayed, that is, when the scrolling operation in the horizontal direction is performed on the web content C31 to C34, the terminal device 100 performs carousel display of moving the web content C31 to C34 displayed on the display region C13 according to the scrolling operation.

In the example illustrated in FIG. 1, the web content C31 to C34 is described as a plurality of pieces of web content, but an embodiment is not limited to this example. For example, the web content C31 to C34 may be single web content having a display size larger than the display region C13 rather than a plurality of pieces of web content. In this case, the terminal device 100 displays a part of web content on the display region C13, and shifts a range of web content to be displayed on the display region C13 according to user's scrolling operation. In the following description, the web content C31 to C34 arranged in the horizontal direction is also referred to as web content C30.

2. Process Executed by Terminal Device 100

Here, the terminal device 100 according to the related art increases a region for displaying predetermined content when the web page scrolling operation is performed. However, in this related art, since the web page display region is decreased with an increase of another content region, when the user views the web page, the user's feeling about content may get worse.

In this regard, the terminal device 100 performs the following process. First, the terminal device 100 displays the web content C30 and the content C20 to be arranged. Then, the terminal device 100 changes a display range of the web content C30 according to a change operation for changing a display range serving as a range in which the web content C30 is displayed on the screen, and changes the content C20 to another content C20.

For example, the terminal device 100 arranges and displays the content C21 on the display region C12, and arranges and displays the web content C31 on the display region C13. The terminal device 100 arranges the web content C32 to C34 on the right side of the web content C31. Then, when the scrolling operation is performed in the region on which the display region C13 is displayed, that is, when the scrolling operation is performed on the web content C30, the terminal device 100 performs carousel display of moving the web content C31 to C34 according to the scrolling operation.

For example, when the scrolling operation in the left direction is performed in the region on which the display region C13 is displayed, the terminal device 100 moves the display range of the web content C30 in the right direction. Further, when the scrolling operation in the right direction is performed in the region on which the display region C13 is displayed, the terminal device 100 moves the display range of the web content C30 in the left direction. In other words, the terminal device 100 scrolls the web content C30 according to an operation of changing the display range of the web content C30.

Further, the terminal device 100 executes the following display change process together with the carousel display. In other words, when the scrolling operation is performed on the web content C30, the terminal device 100 changes the content C21 displayed on the display region C12 to the content C22 according to the scrolling operation.

As described above, the terminal device 100 changes the content C20 according to an operation on the web content C30 without changing the width of the display regions C11 and C12. As a result, the terminal device 100 switches the content C20 without disturbing the user's action of viewing the web content C30 and thus causes the user's feeling on the content C20 to get better.

Further, when the user moves the web content C31 so that the web content C32 is displayed, the terminal device 100 changes the content C20. In other words, the terminal device 100 changes the content C20 according to the operation of the user who is not aware of the content C20. Thus, as a result of providing awareness of the content C20, the terminal device 100 can inspire the user to have an interest in the content C20.

2-1. Content Change Form

Here, when the content C20 is changed through the display change process, the terminal device 100 can change the content C20 in an arbitrary form. An example of changing the content C20 through the terminal, device 100 will be described below. In the following description, a region in which each of the content C21 to C24 is displayed is referred to as a display region of each of the content C21 to C24.

For example, when the scrolling operation on the web content C30 is performed by a predetermined threshold value or more, the terminal device 100 may change the content C21 displayed on the display region C12 to the content C22. In further detail, when a predetermined region of the web content C31 is moved up to the outside further than the display region C13, the terminal device 100 may change the content C21 displayed on the display region C12 to the content C22.

Further, the terminal device 100 may steadily change the content C20 displayed on the display region C12 according to the scrolling operation on the web content C30. For example, the terminal device 100 may reduce a ratio of a region in which the content C21 is displayed in the display region C12 and increase a ratio of a region in which the content C22 is displayed in the display region C12.

In further detail, the terminal device 100 arranges the content C21 on the display region C12, and arranges the content C22 on the back side of the content C21. Further, the terminal device 100 may change the content C21 to the content C22 by steadily reducing the display region of the content C21 from the right side without moving the content C21. Further, when displaying the content C22, if the scrolling operation of moving the web content C30 rightward is performed, the terminal device 100 changes the content C22 to the content C21 by steadily increasing the display region of the content C21 from the left side according to the scrolling operation.

Here, the terminal device 100 may or may not move the content C21 and C22 according to the scrolling operation. For example, when the content C21 and C22 have not been moved, the terminal device 100 can switch content in a form in which the content C21 is steadily erased, and the content C22 starts to be displayed from the back side of the content C21.

Further, when the web content C30 is moved according to the scrolling operation, the terminal device 100 changes the content C20 so that the boundary between the display region of the content C21 and the display region of the content C22 is moved according to the web content C30. For example, the terminal device 100 moves the boundary between the display region of the content C21 and the display region of the content C22 with the movement of the boundary between the web content C31 and the web content C32.

In further detail, the terminal device 100 displays a frame border of a predetermined width as the boundary between the web content C31 and the web content C32. Further, the terminal device 100 displays a frame border of a predetermined width as the boundary between the display region of the content C21 and the display region of the content C22. Then, when the scrolling operation is performed, the terminal device 100 moves the web content C31 and C32 according to the scrolling operation, and reduces the display region of the content C21 so that positions of the respective frame borders in the horizontal direction of the screen match.

As described above, the terminal device 100 can switch the content C20 displayed on the display region C12 in an arbitrary form. An embodiment is not limited to the above-described example, and the terminal device 100 may switch the content C20 in any other form.

2-2. Exemplary Process Executed by Terminal Device 100

An exemplary display change process executed by the terminal device 100 will be described below with reference to FIG. 1. The following description will proceed with an exemplary display change process executed by the terminal device 100 using first to fourth states.

First, the terminal device 100 receives delivery of the web page C10, the content C20, and the web content C30. In this case, the terminal device 100 displays the web page C10 on the entire screen. Further, the terminal device 100 arranges the content C21 to C24 on the display region C12 in a predetermined order in a superimposed manner. Further, the terminal device 100 arranges the web content C31 to C34 side by side in the horizontal direction, and arranges a range in which the web content C31 is arranged on the display region C13. As a result, the terminal device 100 displays the web page C10, displays the content C21 on the display region C12, and displays the web content C31 on the display region C13 as illustrated in a first state of FIG. 1.

Here, when the scrolling operation is performed in the vertical direction by the user's finger F10, the terminal device 100 scrolls the web page C10 in the vertical direction according to the scrolling operation. For example, when the user's finger F10 performs the scrolling operation in the upward direction at an arbitrary position on the screen, the terminal device 100 scrolls the web page C10 in the upward direction. As a result, the terminal device 100 displays the display region C11 on the entire screen as illustrated in a second state. In further detail, the terminal device 100 displays the content C21 and the web content C31 in a form in which the content C21 is displayed on an upper portion of the screen, and the web content C31 is displayed on the remaining region. Further, the terminal device 100 arranges and displays a frame border of a predetermined width around the content C21 and the web content C31.

Here, when the user's finger F10 performs the scrolling operation in the horizontal direction in the region on which the web content C31 is displayed, that is, when the scrolling operation in the horizontal direction is performed in the region of the screen on which the display region C13 is arranged, the terminal device 100 performs the carousel display of moving a range in which the web content C31 to C34 is displayed on the display region C13. For example, as illustrated in the second state, when the scrolling operation of moving the web content C31 to C34 in the left direction is performed by the user's finger F10, the terminal device 100 moves the web content C31 to C34 in the left direction.

Here, the terminal device 100 executes the following display change process as the web content C31 to C34 is scrolled. In other words, the terminal device 100 reduces the width of the display region of the content C21 steadily from the right side of the screen without moving the content C21 and the content C22. In further detail, the terminal device 100 steadily reduces the width of the display region of the content C21 so that the position of the boundary between the web content C31 and the web content C32 matches the position of the right end of the display region of the content C21 in the horizontal direction of the screen.

As a result, the terminal device 100 changes the content C21 to the content C22 as illustrated in a third state of FIG. 1. In other words, the terminal device 100 moves the web content C31 and the web content C32 in the left direction according to the scrolling operation, and reduces the display region of the content C21 so that a position of a frame border of a predetermined width arranged in the boundary of the web content C31 and C32 matches a position of a frame border of a predetermined width arranged at the right end of the content C21 in the horizontal direction of the screen. As a result, the terminal device 100 displays the right half of the web content C31 and the left half of the web content C32 on the display region C13, and displays the left half of the content C21 and the right half of the content C22 on the display region C12.

Then, when the scrolling operation of further moving the web content C30 to the left side is performed, the terminal device 100 moves the web content C31 and the web content C32 in the left direction, and further reduces the display region of the content C21 as illustrated in a fourth state. As a result, for example, the terminal device 100 displays a range of ¼ from the right end of the web content C31 and a range of ¾ from the left end of the web content C32 on the display region C13, and displays a range of ¼ from the left end of the content C21 and a range of ¾ from the right end of the content C22 on the display region C12.

Then, the terminal device 100 moves the web content C31 to the outside of the display region C13, and displays the web content C32 on the display region C13 as illustrated in a fifth state. Further, the terminal device 100 reduces the width of the display region of the content C21 up to zero, and displays the content C22 on the display region C12 as illustrated in the fifth state.

Further, when the scrolling operation of scrolling the web content C32 to the right side is performed in the fifth state, the terminal device 100 switches the content C20 in a form in which the web content C31 to C34 is moved to the right side, and the display region of the content C21 is steadily increased from the left end to the right end. In other words, the terminal device 100 changes the display from the fifth state to the second state via the fourth state and the third state.

Further, when the scrolling operation of scrolling the web content C32 to the left side is performed in the fifth state, the terminal device 100 moves the web content C31 to C34 to the left side, and changes the content C22 to the content C23. In other words, the terminal device 100 moves the web content C32 and C33 leftward as illustrated in a sixth state. Further, the terminal device 100 steadily reduces the display region of the content C22 from the right end to the left end, and displays a part of the content C23 arranged on the back side of the content C22 as illustrated in the sixth state. Thereafter, the terminal device 100 moves the web content C30 in a form similar to the form illustrated in the third state to the fifth state, and changes the content C20.

As described above, the terminal device 100 moves the range in which the web content C30 is displayed on the display region C13 according to a movement operation on the web content C30, and changes the content C20. For example, the terminal device 100 changes the content C20 in a form in which the content C21 is steadily changed to the content C22 from the right end according to the scrolling operation.

In other words, the terminal device 100 changes the content C20 in a different form from scrolling while scrolling the web content C30, and thus can cause the user to be aware of the content C20 without enlarging the display region C12. Accordingly, the terminal device 100 can improve the appeal of information related to the content C20.

2-3. Main Execution Body

Although not described above, the terminal device 100 can implement the above-described process through an arbitrary technique. For example, the terminal device 100 may download an application for causing the terminal device 100 to execute the display change process in advance and execute the above-described process by executing the application at an arbitrary timing. Further, the terminal device 100 receives delivery of control information for executing the display change process at the same time of delivery of the web page C10 or the content C20. Then, the terminal device 100 performs the display change process according to the control information. For example, the terminal device 100 that executes the display change process illustrated in FIG. 1 according to the control information will be described below.

In the following description, an example of delivering the content C20 related to an advertisement as an example of the content C20 will be described, but an embodiment is not limited to this example. In other words, the content C20 is not limited to content related to an advertisement. In the following description, content related to an advertisement is referred to as advertisement content.

3. Configuration of Delivery System

Figure 2:
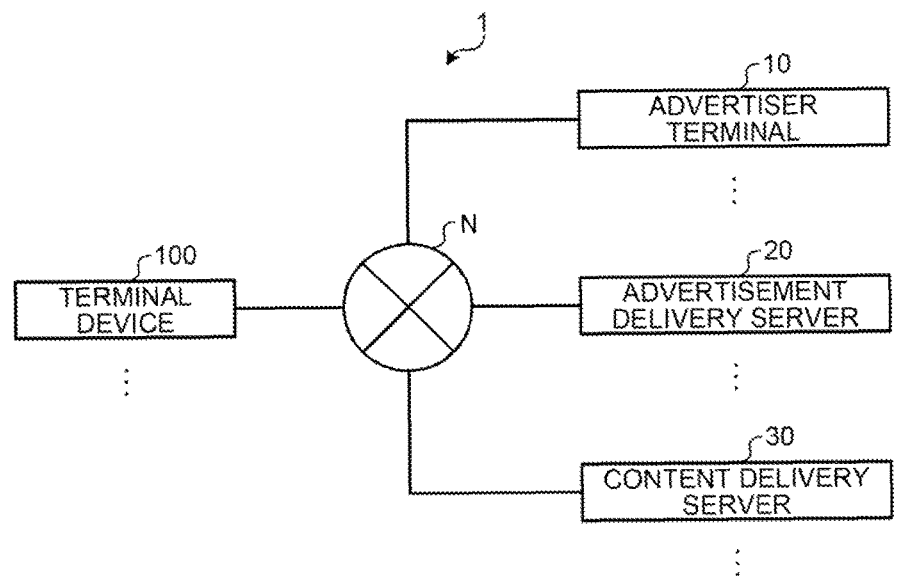
FIG. 2 is a diagram illustrating an exemplary configuration of a delivery system according to an embodiment.

Next, for example, the terminal device 100 that executes the above display process will be described. First, a configuration of a delivery system 1 according to an embodiment will be described with reference to FIG. 2. FIG. 2 is a diagram illustrating an exemplary configuration of a delivery system according to an embodiment. The delivery system 1 includes the terminal device 100, an advertiser terminal 10, the advertisement delivery server 20, and a content delivery server 30 as illustrated in FIG. 2. The terminal device 100, the advertiser terminal 10, the advertisement delivery server 20, and the content delivery server 30 are connected to be able to perform wired or wireless communication via a network N. The delivery system 1 illustrated in FIG. 2 may include a plurality of terminal devices 100, a plurality of advertiser terminals 10, a plurality of advertisement delivery servers 20, or a plurality of content delivery servers 30.

The terminal device 100 is an information processing device used by the user who views the web page. Examples of the terminal device 100 include a mobile telephone such as a smartphone, a tablet terminal, a personal digital assistant (PDA), a desktop personal computer (PC), and a laptop PC. The terminal device 100 acquires the web page C10 from the content delivery server 30 according to an operation performed by the user, and displays the acquired web page C10. Further, when an acquisition command which will be described later is included together with the web page C10, the terminal device 100 acquires the content C20 from the advertisement delivery server 20, and displays the acquired content C20 together with the web page C10.

The advertiser terminal 10 is an information processing device used by an advertiser. Examples of the advertiser terminal 10 includes a desktop PC, a laptop PC, a tablet terminal, a mobile telephone, and a PDA. The advertiser terminal 10 submits the content C20 to the advertisement delivery server 20 as the advertisement content according to an operation performed by an advertiser. For example, the advertiser terminal 10 submits, for example, a uniform resource locator (URL) for acquiring a still image, a moving image, text data, a landing page, or the like as the advertisement content to the advertisement delivery server 20.

Further, there are cases in which the advertiser requests an agent to submit the advertisement content. In this case, an agent submits the advertisement content to the advertisement delivery server 20. Hereinafter, a term "advertiser" is assumed to be a concept including an agent as well as an advertiser, and a term "advertiser terminal" is assumed to be a concept including an agent device used by an agent as well as the advertiser terminal 10.

The advertisement delivery server 20 is a server device that delivers the advertisement content submitted from the advertiser terminal 10. For example, upon receiving the advertisement content delivery request from the terminal device 100, the advertisement delivery server 20 performs matching of the user and the advertisement content based on a location of the terminal device 100, an attribute of the user, or the like, and delivers the advertisement content determined to be a delivery target as a result of matching to the terminal device 100. Further, the advertisement delivery server 20 delivers control information indicating the display form of the advertisement content serving as the delivery target to the terminal device 100 together with the advertisement content. The control information is described by a script language such as JavaScript (a registered trademark) or a cascading style sheets (CSS).

The content delivery server 30 is, for example, a web server that delivers the web page C10 to the terminal device 100. For example, the content delivery server 30 delivers the web page C10 in which various kinds of pieces of information associated with a portal site, a news site, an auction site, a weather forecast site, a shopping site, a finance (stock price) site, a line search site, a map provision site, a travel site, a restaurant introduction site, a web blog, or the like are arranged in a tile form to the terminal device 100. The content delivery server 30 may be a server that delivers, for example, a web page of a portal site in which various kinds of pieces of information are arranged.

The content delivery server 30 generates the web content C30, and delivers the generated web content C30 together with the web page C10. For example, the content delivery server 30 selects content to be arranged in the web content C30 based on various types of news, the number of browsing, a buzzword, or the like, and generates the web content C30 in which the selected content is arranged. Then, the content delivery server 30 delivers the generated web content C30 to the terminal device 100.

Here, the web page C10 delivered by the content delivery server 30 includes the acquisition command. For example, the URL of the advertisement delivery server 20 or the like is described in an HTML file or the like forming the web page C10 as the acquisition command. In this case, the terminal device 100 accesses the URL described in the HTML file or the like and acquires the content C20 from the advertisement delivery server 20 as the advertisement content.

Actually, examples of various kinds of pieces of data delivered from the content delivery server 30 to the terminal device 100 include an HTML file forming a web page, an image, and a moving image superimposedly displayed on a web page.

4. Configuration of Advertisement Delivery Server

Figure 3:
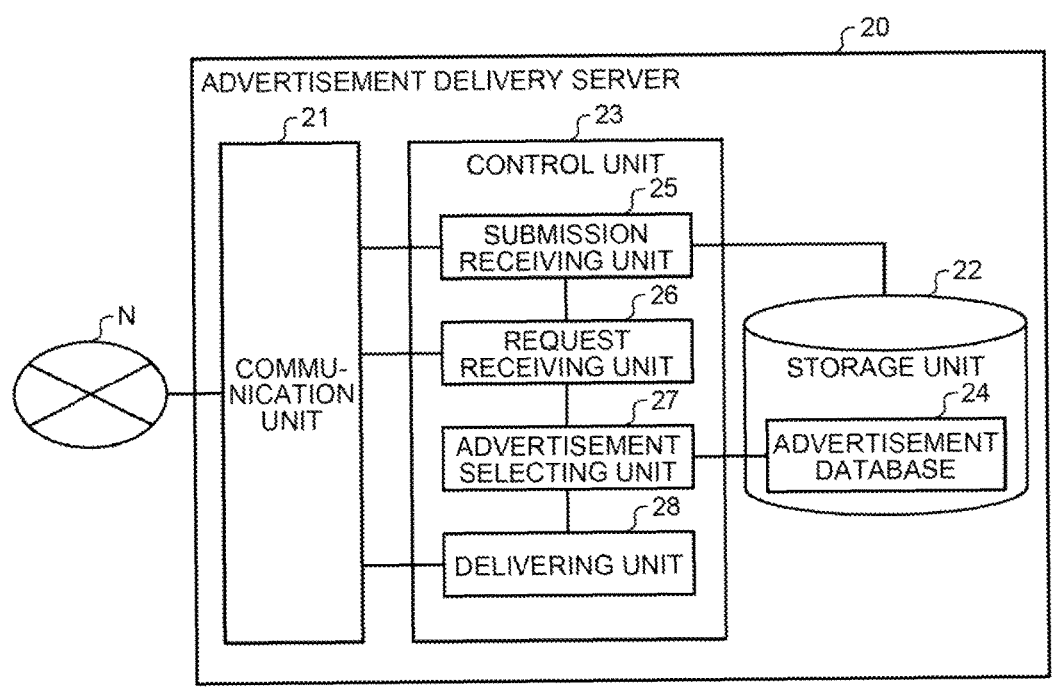
FIG. 3 is a diagram illustrating an exemplary configuration of an advertisement delivery server according to an embodiment.

Next, a configuration of the advertisement delivery server 20 according to an embodiment will be described with reference to FIG. 3. FIG. 3 is a diagram illustrating an exemplary configuration of an advertisement delivery server according to an embodiment. The advertisement delivery server 20 includes a communication unit 21, a storage unit 22, and a control unit 23 as illustrated in FIG. 3.

For example, the communication unit 21 is implemented by a network interface card (NIC) or the like. The communication unit 21 is connected with the network N in a wired or wireless manner, and performs transmission and reception of information with the terminal device 100, the advertiser terminal 10, and the content delivery server 30.

For example, the storage unit 22 is implemented by a semiconductor memory device such as a random access memory (RAM) or a flash memory or a storage device such as a hard disk or an optical disk. The storage unit 22 stores an advertisement database 24 serving as a database in which various kinds of pieces of information related to the advertisement content submitted from the advertiser terminal 10 are stored.

Figures 4, 5:
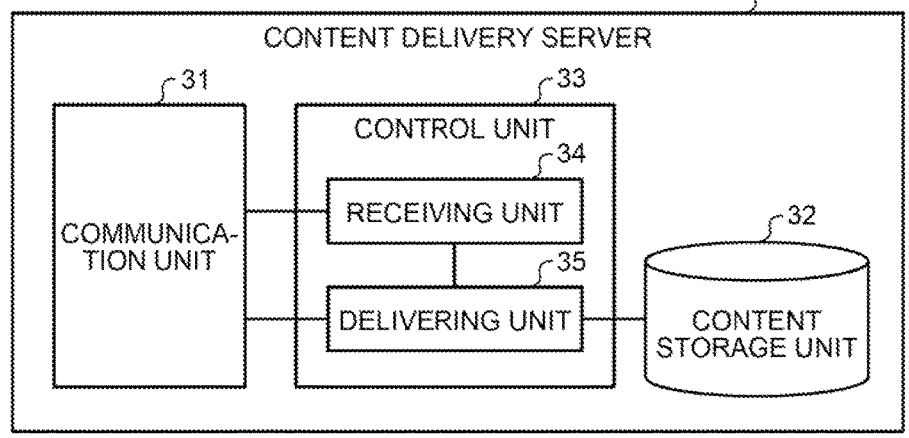
FIG. 4 is a diagram illustrating exemplary information stored in an advertisement database according to an embodiment.
FIG. 5 is a diagram illustrating an exemplary configuration of a content delivery server according to an embodiment.

Here, FIG. 4 is a diagram illustrating exemplary information stored in an advertisement database according to an embodiment. In the example illustrated in FIG. 4, the advertisement database 24 includes entries such as an advertiser ID, the advertisement content, the number of impressions, the number of guaranteed impressions, and a consideration. The advertisement database 24 may further store information for performing matching of content and the user or information such as a click through rate (CTR).

The "advertiser ID" is identification information identifying the advertiser or the advertiser terminal 10. The "advertisement content" indicates content submitted from the advertiser terminal 10, that is, content related to an advertisement. In FIG. 4, an example in which conceptual information such as "C20" and "C50" to "C80" are stored in the "advertisement content" is illustrated, but, practically, for example, a URL in which each content such as an individual image, a moving image, a sound and image, text data, game data, an advertisement of a game form, or the like in which common information is desired to be transferred to the user is located, a file path name indicating a storage location thereof, or the like is stored.

The "number of impressions" is the number of times that the advertisement content is displayed. The "number of guaranteed impressions" is the number of displays of the advertisement content guaranteed on a consideration. The "consideration" indicates a compensation paid by the advertiser when the advertisement content is displayed by the "number of guaranteed impressions." In other words, the advertisement delivery server 20 is a server that delivers content related to an advertisement in an impression guaranteed type form.

In other words, FIG. 4 illustrates an example in which an advertiser identified by an advertiser ID "B10" submits pieces of content C20, C50, and C60 as the advertisement content. Further, FIG. 4 illustrates an example in which the number of impressions of the advertisement content "C20" is "10000," the number of guaranteed impressions is "20000," and a fee amount when the content "C20" is displayed by the number of guaranteed impressions is "aaa."

Here, control instruction for instructing a display form in which each content is displayed is registered in the advertisement database 24 as the advertisement content. For example, the control instruction is assumed to include information for designating a display change operation such as a form in which the content C21 to C24 is changed, an order in which the content C21 to C24 is superimposed, an operation by which a change is performed, a condition in which the display change process is started, or an URL of a landing page.

Further, when content related to an advertisement is delivered in a pay per click form in which a fee is charged each time the advertisement content is selected, the number of times that content is selected, a fee when content is selected, and the like are registered in the advertisement database 24. Further, when the delivery request is received, the advertisement content is selected in a bidding form, and when the selected advertisement content is delivered, a bidding price serving as an advertising fee set by the advertiser as a compensation per impression, a CTR, or the like is registered to the advertisement database 24.

Returning to FIG. 3, the description is continued. For example, the control unit 23 is implemented by executing various kinds of programs stored in a storage device inside the advertisement delivery server 20 through a central processing unit (CPU) or a micro processing unit (MPU) using a RAM as a work region. For example, the control unit 23 is implemented by an integrated circuit such as an application specific integrated circuit (ASIC) or a field programmable gate array (FPGA).

As illustrated in FIG. 3, the control unit 23 includes a submission receiving unit 25, a request receiving unit 26, an advertisement selecting unit 27, and a delivering unit 28, and implements or executes a function or an operation of information processing which will be described below. The internal configuration of the control unit 23 is not limited to the configuration illustrated in FIG. 3, and may be any other configuration as long as information processing which will be described later is performed. Further, a connection relation between processing units of the control unit 23 is not limited to a connection relation illustrated in FIG. 3 and may be any other connection relation.

The submission receiving unit 25 receives submission of the advertisement content from the advertiser terminal 10. Specifically, the submission receiving unit 25 receives submission of the advertisement content. Further, the submission receiving unit 25 receives the content C20 and the control instruction. In this case, the submission receiving unit 25 registers the content C20 and the control instruction in the advertisement database 24 together with the advertiser ID. Further, the submission receiving unit 25 registers the number of guaranteed impressions, the consideration, or the like according to a registration from the advertiser terminal 10 or a setting performed by a provider of a service provided through the delivery system 1.

The request receiving unit 26 receives an advertisement content acquisition request from the terminal device 100. For example, the request receiving unit 26 receives an HTTP request as the advertisement content acquisition request.

When the advertisement content acquisition request is received by the request receiving unit 26, the advertisement selecting unit 27 selects advertisement content of a delivery candidate from the advertisement database 24. For example, the advertisement selecting unit 27 performs matching of the advertisement content serving as the delivery target from the advertisement content registered in the advertisement database 24 based on the position of the terminal device 100 or an attribute of the user. In this matching, the selecting of the advertisement content is performed so that the number of impressions is larger than the number of guaranteed impressions. For example, the advertisement selecting unit 27 preferentially selects the advertisement content whose difference between the number of guaranteed impressions and the number of impressions is largest. The advertisement selecting unit 27 may preferentially select the advertisement content that is high in either or both of the bidding price and the CTR. Then, the advertisement selecting unit 27 outputs the advertisement content selected as the delivery target to the delivering unit 28.

Further, when a web page is a search page, the advertisement selecting unit 27 may use an advertisement delivery technique called search advertising of extracting advertisement content matching a search keyword designated in the search page. The advertisement selecting unit 27 may use an advertisement delivery technique called targeting delivery of extracting advertisement content matching attribute information (a psychographic attribute, a demographic attribute, or the like) of the user.

The delivering unit 28 delivers the control information to the terminal device 100 together with the advertisement content selected by the advertisement selecting unit 27. Specifically, upon receiving the advertisement content selected by the advertisement selecting unit 27, the delivering unit 23 extracts the control instruction included in the received advertisement content. Then, the delivering unit 28 generates control information of causing the terminal device 100 to execute the content display change process indicated by the extracted control instruction. Thereafter, the delivering unit 23 delivers the generated control information and the advertisement content to the terminal device 100.

5. Configuration of Content Delivery Server

Next, a configuration of the content delivery server 30 according to an embodiment will be described with reference to FIG. 5. FIG. 5 is a diagram illustrating an exemplary configuration of a content delivery server according to an embodiment. The content delivery server 30 includes a communication unit 31, a content storage unit 32, and a control unit 33 as illustrated in FIG. 5.

For example, the communication unit 31 is implemented by an NIC or the like. The communication unit 31 is connected with the network N in a wired or wireless manner, and performs transmission and reception of information with the terminal device 100 and the advertisement delivery server 20.

For example, the content storage unit 32 is implemented by a semiconductor memory device such as a RAM or a flash memory or a storage device such as a hard disk or an optical disk. The content storage unit 32 stores a web page serving as an example of content. For example, the content storage unit 32 stores an HTML file forming a web page or a still image or a moving image to be displayed on a web page.

For example, the control unit 33 is implemented by executing various kinds of programs stored in a storage device inside the content delivery server 30 through a CPU or an MPU using a RAM as a work region. For example, the control unit 33 is implemented by an integrated circuit such as an ASIC or an FPGA.

As illustrated in FIG. 5, the control unit 33 includes a receiving unit 34 and a delivering unit 35, and implements or executes a function or an operation of information processing which will be described below. The internal configuration of the control unit 33 is not limited to the configuration illustrated in FIG. 5, and may be any other configuration as long as information processing which will be described later is performed. Further, a connection relation between processing units of the control unit 33 is not limited to a connection relation illustrated in FIG. 5 and may be any other connection relation.

The receiving unit 34 receives a web page acquisition request from the terminal device 100. For example, the receiving unit 34 receives an HTTP request as the web page acquisition request.

When the web page acquisition request is received by the receiving unit 34, the delivering unit 35 delivers the web page to the terminal device 100. Specifically, the delivering unit 35 acquires a web page of an acquisition request target from the content storage unit 32, and delivers the acquired web page to the terminal device 100.

The delivering unit 35 generates the web content C30, and delivers the generated web content C30 to the terminal device 100. In this case, upon receiving the web page C10 and the web content C30, the terminal device 100 transmits an advertisement delivery request to the advertisement delivery server 20, and displays advertisement content received as a response. Then, the terminal device 100 executes the display change process of changing the advertisement content according to the user's operation.

6. Configuration of Terminal Device

Figure 6:
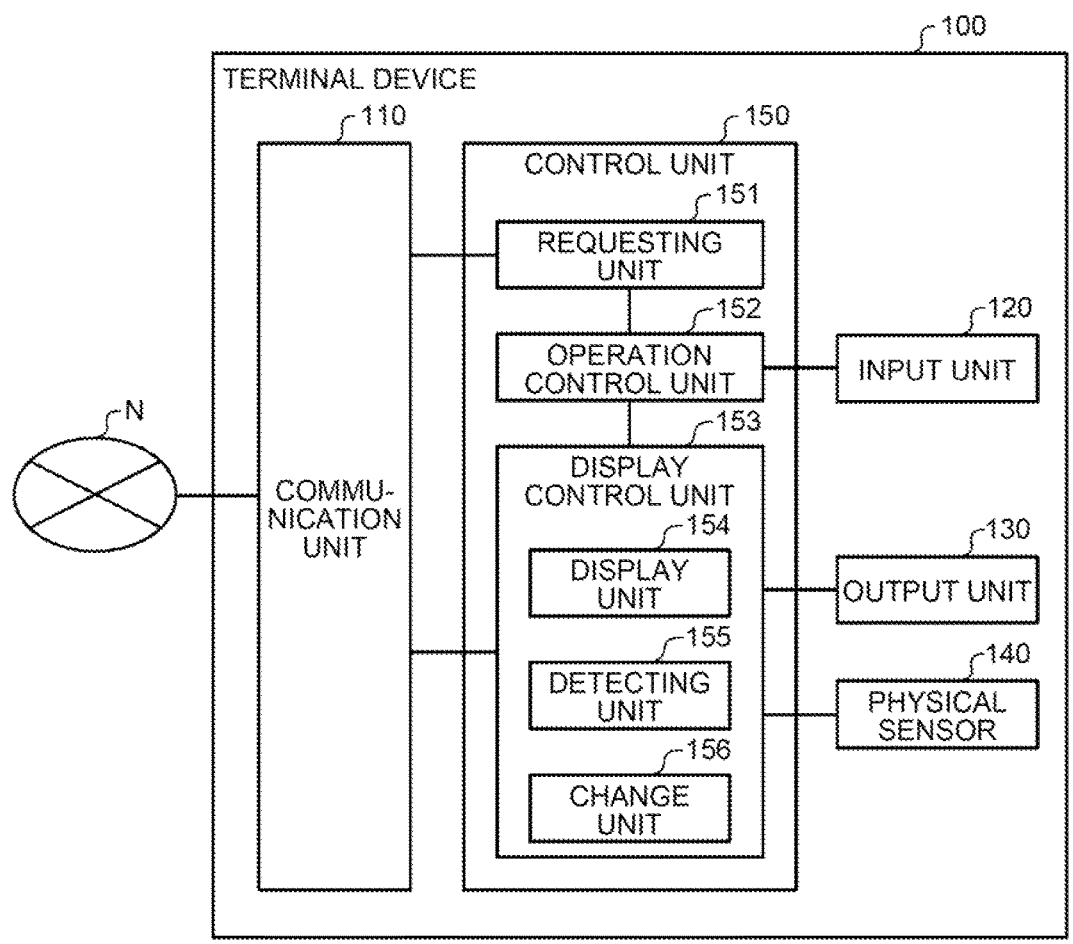
FIG. 6 is a diagram illustrating an exemplary configuration of a terminal device according to an embodiment.

Next, a configuration of the terminal device 100 according to an embodiment will be described with reference to FIG. 6. FIG. 6 is a diagram illustrating an exemplary configuration of a terminal device according to an embodiment. The terminal device 100 includes a communication unit 110, an input unit 120, an output unit 130, a physical sensor 140, and a control unit 150 as illustrated in FIG. 6.

For example, the communication unit 110 is implemented by an NIC or the like. The communication unit 110 is connected with the network N in a wired or wireless manner, and performs transmission and reception of information with the advertisement delivery server 20 and the content delivery server 30.

The input unit 120 is an input device that receives various kinds of operations from the user. For example, the input unit 120 is implemented by a keyboard, a mouse, an operation key, or the like. The output unit 130 is a display device that displays various kinds of pieces of information. For example, the output unit 130 is implemented by an LCD or the like. When a touch panel is employed in the terminal device 100, the input unit 120 is integrated with the output unit 130. In the following description, there are cases in which the screen is described as the output unit 130.

The physical sensor 140 is a sensor that detects a physical state of the terminal device 100. For example, the physical sensor 140 is a gyroscopic sensor that measures an inclination of the terminal device 100 in a three-axis direction. The physical sensor 140 is not limited to a gyroscopic sensor, and an arbitrary sensor such as an acceleration sensor, a temperature sensor, a volume sensor, or a luminance sensor is applicable as the physical sensor 140.

For example, the control unit 150 is implemented by executing various kinds of programs stored in a storage device inside the terminal device 100 through a CPU or an MPU using a RAM as a work region. For example, various kinds of programs correspond to an application program called a web browser. For example, the control unit 150 is implemented by an integrated circuit such as an ASIC or an FPGA.

As illustrated in FIG. 6, the control unit 150 includes a requesting unit 151, an operation control unit 152, and a display control unit 153, and implements or executes a function or an operation of information processing which will be described below. The internal configuration of the control unit 150 is not limited to the configuration illustrated in FIG. 6, and may be any other configuration as long as information processing which will be described later is performed. Further, a connection relation between processing units of the control unit 150 is not limited to a connection relation illustrated in FIG. 6 and may be any other connection relation.

Upon receiving a URL of the web page C10 from the operation control unit 152, the requesting unit 151 transmits an acquisition request of the web page C10 indicated by the received URL to the content delivery server 30. Further, when the acquisition command is included in the web page received from the content delivery server 30, the requesting unit 151 transmits the advertisement content acquisition request to the advertisement delivery server 20.

The operation control unit 152 executes various kinds of control according to the user's operation received through the input unit 120. For example, when the user performs an operation of displaying the web page C10 on the input unit 120, the operation control unit 152 outputs the URL of the web page C10 serving as the display target to the requesting unit 151. Further, the operation control unit 152 outputs content of the user's operation received through the input unit 120 to the display control unit 153.

For example, when the user's finger F10 is moved while touching the screen, the operation control unit 152 determines that the scrolling operation has been performed, and notifies the display control unit 153 of a movement direction of the finger F10, that is, a scrolling direction, a movement amount of the finger, that is, a scrolling amount. Further, when the user's finger F10 taps the screen, the operation control unit 152 notifies the display control unit 153 of a tapped position. Further, when the acquisition command is included in the web page C10 received by the display control unit 153, the operation control unit 152 instructs the advertisement delivery server 20 to transmit the advertisement content acquisition request to the requesting unit 151.

The display control unit 153 executes a process of displaying the received web page and the advertisement content through the output unit 130. For example, when the control unit 150 executes the control information delivered together with the advertisement content, the display control unit 153 operates as a display unit 154, a detecting unit 155, and a change unit 156, and executes the display change process as illustrated in FIG. 6. For example, the display unit 154, the detecting unit 155, and the change unit 156 are implemented by executing the control information through a CPU or an MPU, or the like using as a RAM as a work region.

The display unit 154 displays the content C20 and the web content C30 side by side. Specifically, the display unit 154 displays the web page C10 on the screen, and arranges the content C21 to C24 on the display region C12 in a superimposed manner. Further, the display unit 154 arranges the web content C31 to C34 side by side in the horizontal direction, and displays a range in which the web content C31 is arranged on the display region C13. The display unit 154 arranges and displays a frame border of a predetermined width around the content C20 and the web content C30. The display unit 154 arranges and displays a frame border of a predetermined width in the boundary of the web content C31 to C34.

The display unit 154 scrolls the web page C10 according to the scrolling operation when the scrolling operation is performed in the vertical direction of the screen. The display unit 154 changes the display form of the content C20 displayed on the display region C12 and the web content C30 according to an instruction of the change unit 156 which will be described later. Further, when any one of the content C21 to C24 is selected, the display unit 154 displays a landing page corresponding to the selected content.

The detecting unit 155 detects the position of the frame border arranged in the boundary of the web content C31 to C34. For example, the detecting unit 155 detects the position of the frame border arranged between the web content C31 and the web content C32 at predetermined time intervals. The detecting unit 155 is assumed to detect the position of the frame border arranged between the web content C32 and the web content C33 and the position of the frame border arranged between the web content C33 and the web content C34 as well.

The change unit 156 changes the display range of the web content C30 according to an operation of changing the display range of the web content C30, and changes the content C20.

For example, the change unit 156 scrolls the web content C30 according to the scrolling operation when the scrolling operation is performed in the horizontal direction of the screen in the region on which the display region C13 is displayed, that is, the region on which the web content C30 is displayed. In the following description, the scrolling operation on the web content C30 is described as the scrolling operation that is performed in the horizontal direction of the screen in the region on which the web content C30 is displayed.

Further, for example, when the content C21 is displayed on the display region C12, the terminal device 100 changes the content C21 to the content C22. In further detail, the change unit 156 reduces the ratio of the display region of the content C21 in the display region C12, and increases the ratio of the display region of the content C22 in the display region C12 according to the scrolling operation on the web content C30.

For example, when the content C22 is arranged on the back side of the content C21, the change unit 156 steadily reduces the width of the display region of the content C21 while steadily increasing the width of the display region of the content C22 arranged on the back side according to the scrolling operation without moving the content C21. In further detail, the change unit 156 fixes the position of the left end of the display region of the content C21, and steadily moves the position of the right end of the display region of the content C21 to the left side when the scrolling operation of scrolling the web content C30 in the left direction is performed. As a result, the change unit 156 steadily reduces the ratio of the display region of the content C21, and steadily increases the ratio of the display region of the content C22 arranged on the back side of the content C21.

Here, the change unit 156 changes the content C21 to the content C22 so that the position of the boundary between the display region of the content C21 and the display region of the content C22 changes with the movement of the web content C30. For example, the change unit 156 reduces the width of the display region of the content C21 at the same speed as the speed at which the web content C30 is scrolled.

For example, the change unit 156 moves the boundary between the display region of the content C21 and the display region of the content C22 with the movement of the boundary line between the content C31 and the content C32. For example, the change unit 156 acquires the position of the boundary line between the content C31 and the content C32 detected by the detecting unit 155.

Then, the change unit 156 compares the position of the boundary line in which the boundary between the display region of the content C21 and the display region of the content C22 is positioned with the position of the boundary line detected by the detecting unit 155, and when the positions of the boundary lines in the horizontal direction of the screen are different, the change unit 156 adjusts the positions of the boundary lines in the horizontal direction of the screen by changing the width of the display region of the content C21. For example, the change unit 156 moves the position of the boundary line arranged at the right end of the display region of the content C21 in the horizontal direction of the screen up to the position of the boundary line in the horizontal direction of the screen which is detected by the detecting unit 155.

The change unit 156 may execute the display change process of changing the content C20 in an arbitrary form in addition to the display change process implemented by the above-described process. The change unit 156 may perform the process of scrolling the web content C30 or change the content C20 by controlling the output unit 130 directly or may implement the display change process by controlling the display unit 154.

7. Variation of Display Change Process

The exemplary display change process performed by the terminal device 100 using the display form illustrated in FIG. 1 has been described above. However, an embodiment is not limited to this example. A variation of the display change process executed by the terminal device 100 will be described below. For example, a display change process which will be described below is implemented such that the display unit 154 performs various kinds of display according to control by the change unit 156, but an embodiment is not limited to this example.

7-1. Example of Full-Scale Content

In the above example, the terminal device 100 displays the content C20 on the display region C12, and displays the web content C30 on the display region C13. However, an embodiment is not limited to this example. For example, when the terminal of the web content C30 is displayed on the display region C13, when the scrolling operation is further performed on the web content C30, the terminal device 100 may change the content C20 and the web content C30 to a predetermined full-scale content. Here, the full-scale content is content that is larger in the display size than the content C20, and is an image used to transfer, for example, the content C20 and common information to the user.

Figure 7:
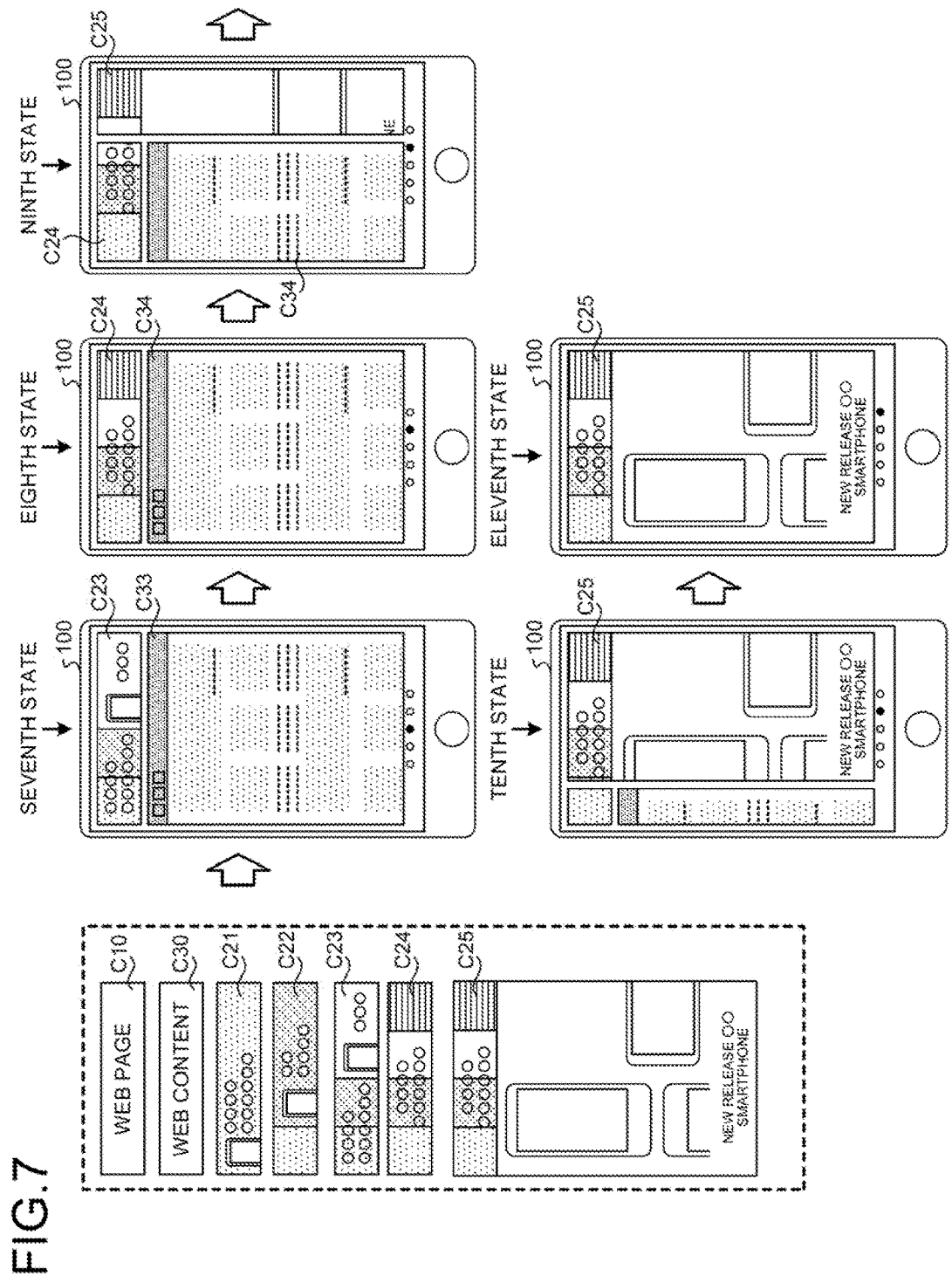
FIG. 7 is a diagram for describing an exemplary process of displaying full-scale content through a terminal device according to an embodiment.

Next, an exemplary process of displaying the full-scale content instead of the content C20 and the web content C30 will be described with reference to FIG. 7. FIG. 7 is a diagram for describing an exemplary process of displaying the full-scale content through a terminal device according to an embodiment. For example, the terminal device 100 receives delivery of the web page C10, the web content C30, the content C21 to C24, and full-scale content C25. The web page C10, the web content C30, and the content C21 to C24 are assumed to be the same content as the web page C10, the web content C30, and the content C21 to C24 which are illustrated in FIG. 1.

Here, the content C25 is an image in which the horizontal width of the display size is the same as that of the display regions C12 and C13, and the vertical width of the display size is the same as a distance from the upper end of the display region C12 to the lower end of the display region C13. Further, the same image as the content C24 is arranged in a range (hereinafter, referred to as a range corresponding to the display region C12) included in a region in which the display region C12 is displayed when the content C25 is displayed within the screen. For example, in the example illustrated in FIG. 7, in the content C25, the same image as the content C24 is arranged in the range corresponding to the display region C12, and a photograph related to an advertisement, an advertising copy, or the like is arranged in the remaining region.

In this case, the terminal device 100 displays the content C21 to C24 on the display region C12 in the superimposed manner, arranges the web content C31 to C34 side by side in the horizontal direction, and displays the web content C31 to C34 on the display region C13. Then, when the scrolling operation is performed on the web content C30, the terminal device 100 changes the content C21 to C24 as necessary while scrolling the web content C30 in the display form illustrated in the first to sixth states of FIG. 1.

Further, when the scrolling operation of moving the web content C30 leftward is performed in the sixth state of FIG. 1, the terminal device 100 displays the content C23 on the display region C12, and displays the web content C33 on the display region C13 as illustrated in a seventh state of FIG. 7. Further, when the scrolling operation of further moving the web content C30 leftward is performed in the seventh state, the terminal device 100 changes the content C23 to the content C24 in the display form similar to that of the second to fifth states of FIG. 1. As a result, the terminal device 100 displays the content C24 on the display region C12, and displays the web content C34 on the display region C13 as illustrated in an eighth state of FIG. 7.

Here, in the eighth state, the terminal device 100 displays the web content C34 that is at the terminal of the web content C30. Thus, in the eighth state, the terminal device 100 changes the content C24 and the content C34 to the full-scale content C25 when the scrolling operation of scrolling the web content C30 leftward is performed.

For example, the terminal device 100 reduces the width of the display region of the web content C30 and the width of the display region of the content C20 and increases the width of the display region of the content C25 according to the scrolling operation. In further detail, the terminal device 100 arranges the full-scale content C25 at the back sides of the display regions C12 and C13. Then, the terminal device 100 executes the following display change process without moving the full-scale content C25 when the scrolling operation is performed on the web content C30.

First, the terminal device 100 steadily reduces the width of the display region C13 while scrolling the web content C34 to the left side. Further, the terminal device 100 steadily reduces the width of the display region C12 without moving the content C24. As a result, as illustrated in a ninth state, the terminal device 100 changes the content C20 and the web content C30 to the full-scale the content C34 in a form in which the width of the region in which the content C24 and the web content C34 are displayed is steadily reduced from the right, and the width of the region in which the full-scale content C25 is displayed is steadily increased from the right side.

Further, when the scrolling operation of further scrolling the web content C30 to the left side is performed, the terminal device 100 further reduces the width of the region in which the content C24 and the web content C34 are displayed, and steadily increases the width of the region in which the full-scale content C25 is displayed from the right side as illustrated in a tenth state. Then, the terminal device 100 displays the entire full-scale content C25 within the display region C11 as illustrated in an eleventh state.

As described above, the terminal device 100 reduces the display region of the web content C30 and the display region of the content C20 and increases the width of the region in which the full-scale content C25 is displayed according to the scrolling operation. Thus, the terminal device 100 can cause the user to feel information that is desired to be transferred through the content C20 and the full-scale content C25.

Further, the terminal device 100 displays the full-scale content C25 in which the same image as the content C24 is arranged on the range corresponding to the display region C12. Thus, the terminal device 100 can provide the user with, for example, a feeling that the display region C12 is in a transmission state when the content C24 is displayed.

In the example illustrated in FIG. 7, the terminal device 100 displays the content C22 in which the region having the same background as the background of the content C21 is arranged at the left end, the content C23 in which the region having the same background as the background of the content C22 is arranged at the left end, and the content C24 in which the region having the same background as the background of the content C23 is arranged at the left end. When the content C20 is displayed through the above display change process, for example, the terminal device 100 switches the content C21 to C24 in a complicated form in which the content C21 to C24 are superimposed steadily while being shifted bit by bit. Thus, the terminal device 100 can inspire the user to have an interest in the content C20.

7-2. Control of Moving Image

In the above example, the terminal device 100 displays an image as the content C20. However, an embodiment is not limited to this example. For example, the terminal device 100 may display a moving image as the content C20. Further, for example, the terminal device 100 may switch a graphics interchange format (GIF) image as necessary and display the content C20 including a so-called GIF moving image of implementing a moving image. Further, the terminal device 100 may control reproduction of the GIF moving image included in the content C20 according to the scrolling operation.

Figure 8:
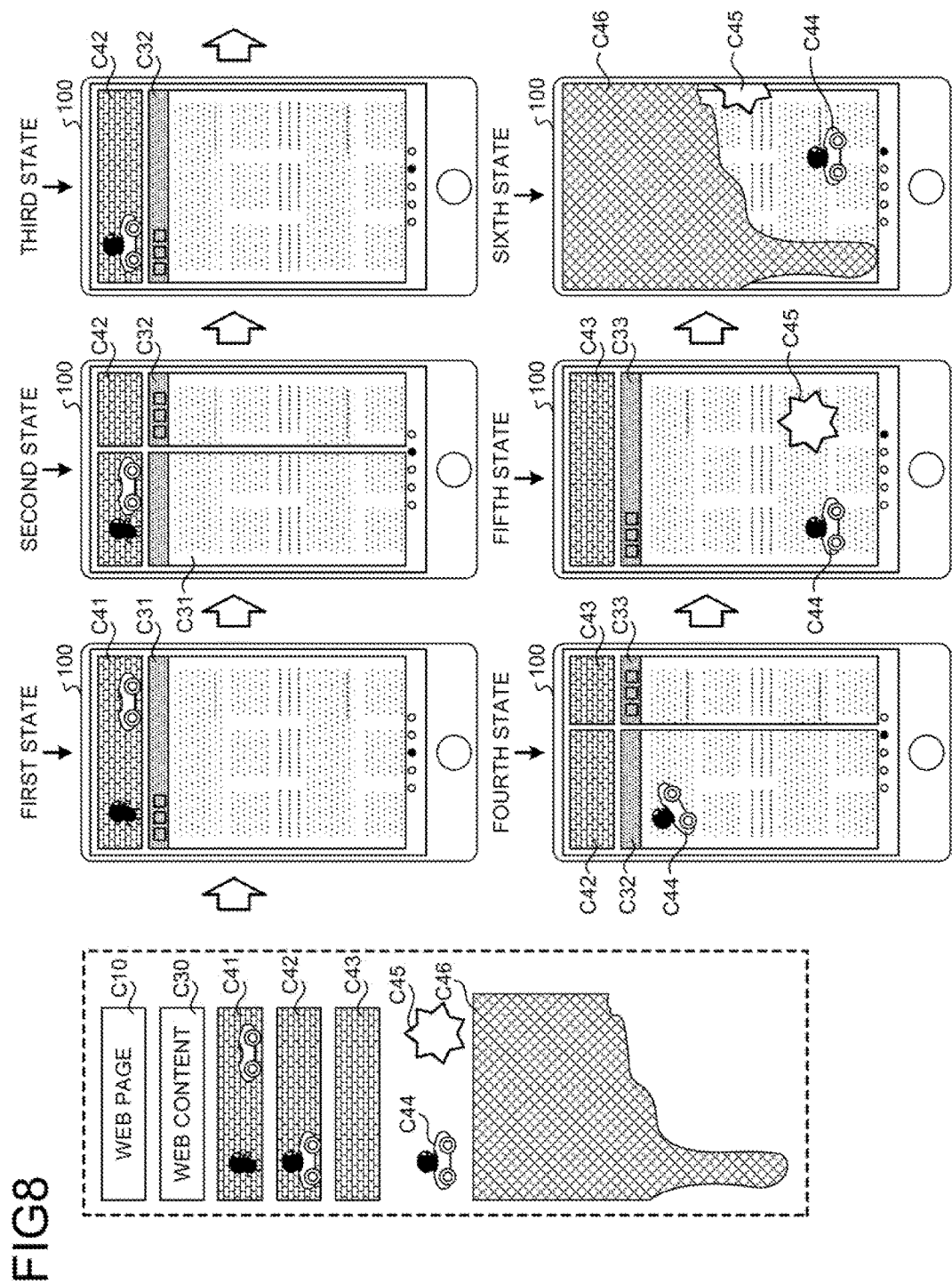
FIG. 8 is a diagram for describing an exemplary process of displaying a moving image through a terminal device according to an embodiment.

Next, an exemplary process of displaying the content C20 including the moving image through the terminal device 100 will be described with reference to FIG. 8. FIG. 8 is a diagram for describing an exemplary process of displaying a moving image through a terminal device according to an embodiment. For example, the terminal device 100 receives delivery of the web page C10 and the web content C30. Further, the terminal device 100 receives content C41 to C46 including the GIF moving image.

The pieces of content C41 to C43 are content having the same size as the display region C12. Here, for example, the content C41 includes a GIF moving image in which a predetermined character approaches and rides a car. The content C42 includes a GIF moving image in which the car ridden by the character travels. The content C43 includes a GIF moving image in which the car ridden by the character jumps and disappears.

The content C44 is a GIF moving image in which a tire of the car ridden by the character rotates. The content C45 is a GIF moving image in which a predetermined icon rotates. The content C46 is content having the same display size as the full-scale content C25 and includes a GIF moving image in which a display region is steadily colored with a predetermined color in a form in which a liquid drops from the top edge.

Upon receiving the delivery of the content C41 to C46, the terminal device 100 executes the following process. First, the terminal device 100 displays the web content C31 on the display region C13, and displays the content C41 on the display region C12 as illustrated in a first state of FIG. 8. Then, the terminal device 100 executes the display change process illustrated in FIG. 1 when the scrolling operation in the left direction is performed on the web content C30, and reproduces the GIF moving image included in the content C41 according to the scrolling operation.

For example, the terminal device 100 reproduces the GIF moving image in which the character approaches and rides the car according to the scrolling operation as illustrated in a second state of FIG. 8. When the scrolling operation in the left direction is further performed, the terminal device 100 executes the display change process, changes the content C41 to the content C42, and displays the content C32 on the display region C13. Here, when the scrolling operation in the left direction is further performed, the terminal device 100 executes the display change process, changes the content C42 to the content C43, and reproduces the GIF moving image included in the content C42.

Here, when the display region of the content C42 is reproduced to be smaller than a predetermined threshold value according to the scrolling operation, for example, when the car ridden by the character included in the content C42 jumps, the terminal device 100 arranges the content C44 in front of the web page C10 and changes a display position of the content C44 according to the scrolling operation as illustrated in a fourth state of FIG. 8.

For example, the terminal device 100 changes the display position of the content C44 according to the scrolling operation in the left direction in a form in which the content C44 drops from the screen information and lands at a predetermined position. Further, the terminal device 100 arranges the content C45 in front of the web page C10, and steadily moves the content C45 from the right side of the screen to a predetermined position according to the scrolling operation. The terminal device 100 reproduces the GIF moving images of the content C44 and the content C45 according to the scrolling operation.

As a result, the terminal device 100 displays the web content C43 and the web content C45 in front of the web content C30 as illustrated in a fifth state of FIG. 8. Further, when the scrolling operation in the left direction is further performed, the terminal device 100 moves the content C43 rightward, and moves the content C45 to the outside of the screen in a form in which an icon coming into contact with the car is knocked off.

The terminal device 100 arranges the content C46 in front of the web page C10 and the content C44 and C45. Then, the terminal device 100 reproduces the GIF moving image included in the content C46 according to the scrolling operation. As a result, the terminal device 100 performs the display change process in a form in which the display region C11 is steadily colored with a predetermined color according to the scrolling operation as illustrated in a sixth state of FIG. 8.

Further, when the scrolling operation in the right direction is performed, the terminal device 100 may reversely reproduce the GIF moving images included in the content C41 to C46. Further, when the scrolling operation in the right direction is performed, the terminal device 100 may move the display positions of the content C44 and C45 in a direction opposite to a direction when the scrolling operation in the left direction is performed. In other words, when the scrolling operation in the right direction is performed, the terminal device 100 may implement the display change process in order from the sixth state to the first state illustrated in FIG. 8.

Further, for example, the terminal device 100 may control the GIF moving images included in the content C44 and C45 independently of the scrolling operation. For example, the terminal device 100 may continuously reproduce the GIF moving images included in the content C44 and C45. Further, the terminal device 100 may display the content C41 and C42 configured with a plurality of pieces of content such as a character, a car, a car ridden by a character, and a background and control reproduction of the GIF moving image independently for each content.

As described above, the terminal device 100 displays the content C41 to C46 including the moving image, and controls reproduction of the moving images of the content C41 to C46 according to the scrolling operation. Further, the terminal device 100 arranges the content C44 to C46 in front of the content C41 to C43 and the web content C30, and displays the content C44 to C46 at the positions according to the scrolling operation. Thus, the terminal device 100 can display the content C41 to C46 changing in the complicated form and thus can cause the user to feel information that is desired to be transferred by the content C41 to C46.

7-3. Form of Display Change Process

The terminal device 100 reduces the width of the display region of the content C21 according to the scrolling operation in the left direction and displays the content C22. However, an embodiment is not limited to this example. For example, the terminal device 100 may change content by arranging the content C22 in front of the content C21 and steadily increasing the width of the display region of the content C22 according to the scrolling operation. Further, for example, the terminal device 100 may change content in a form in which the content C22 is moved from the left side of the screen and superimposed on the content C21. Furthermore, the terminal device 100 may change content in a form in which the content C22 is moved to the display region C12 in a different direction from a direction of the scrolling operation.

Further, the terminal device 100 may change content by changing transmittance of the content C21 or the content C22 according to the scrolling operation. Furthermore, the terminal device 100 may change content by combining the above-described arbitrary processes according to the scrolling operation. In other words, the terminal device 100 may change content in an arbitrary form.

Further, when the carousel display is performed, the terminal device 100 may switch the web content C31 to C34 displayed on the display region C13 in a form similar to the content C21 to C24.

7-4. Switching of Landing Page

For example, when the user selects the content C21 to C24, the terminal device 100 may display a predetermined common landing page or may display a different landing page according to selected content. Further, for the content C24 and C25, the terminal device 100 may display a different landing page according to a region selected by the user. For example, the terminal device 100 may display a landing page set to another content having the same background as the region selected by the user.

After the sixth state illustrated in FIG. 8, the terminal device 100 may display a predetermined landing page when the scrolling operation in the left direction is further performed. Further, when each of the content C41 to C46 is selected by the user, the terminal device 100 may display a different landing page according to selected content.

The terminal device 100 displays a different landing page according to a position or content selected by the user as described above and thus can cause the user to feel various pieces of information that are desired to be transferred by the content C21 to C25 and C41 to C46.

7-5. Suggestion of Change

In the above example, the terminal device 100 displays the content C20 and the web content C30 having the frame border arranged therearound within the display region C11. Here, the terminal device 100 may perform display suggesting a display form in which the content C20 is changed according to the scrolling operation. For example, when the scrolling operation is performed on the web content C30, the terminal device 100 may emphasize the content C20.

Further, the terminal device 100 may suggest a change in the content C20 by displaying part of the content C21 and C23 on the right and left sides when displaying the content C22 on the display region C12. For example, the terminal device 100 receives delivery of the content C20 having the horizontal width of the display size equal to the horizontal width of the display region C11. Further, the terminal device 100 may display the content C22 on the display region C12 having the smaller the horizontal width than that of the example illustrated in FIG. 1, display part of the content C21 (for example, the left end of the content C21) on the left side of the display region C12, and display part of the content C22 (for example, the right end of the content C22) on the right side of the display region C12.

When the content C20 is displayed in this form, the terminal device 100 displays content before change and content after change on the left and right of the display region C12 each time the content C20 is changed. Thus, the terminal device 100 can suggest that the content C20 is changed to the user and thus inspire the user to have an interest in the content C20.

7-6. Variation of Display Change Process

The terminal device 100 arranges the content C22 on the back side of the content C21, and changes the content C20 in a form in which the width of the display region of the content C22 arranged on the back side is steadily increased by steadily reducing the width of the display region of the content C21 according to the scrolling operation. However, an embodiment is not limited to this example. For example, the terminal device 100 may change the content C20 by moving the content C22 arranged in front of the content C21 from the outside of the screen to the inside of the display region C12 according to the scrolling operation without moving the content C21. When this process is executed, the terminal device 100 can change the content C20 in a form in which the content C22 arranged on the front surface of the content C21 sweeps from the outside of the screen according to the scrolling operation.

Further, the terminal device 100 may display the full-scale content C25 in a similar form. For example, the terminal device 100 may change the content C24 to the full-scale content C25 by moving the full-scale content C25 arranged on the front surfaces of the content C24 and the web content C34 from the outside of the screen to the inside of the screen when the scrolling operation is performed. When this process is executed, the terminal device 100 can change the content C20 in a form in which the full-scale content C25 arranged on the front surface of the content C24 sweeps from the outside of the screen according to the scrolling operation. As a result of the above process, the terminal device 100 can improve the appeal of information related to the content C20 as a result of providing a feeling about information related to the content C20.

7-7. Type of Content

The terminal device 100 displays the content C21 to C25 including the image and the content C41 to C46 including the moving image. However, an embodiment is not limited to this example. For example, the terminal device 100 may display content including a moving image and an image. Further, the terminal device 100 may display content including a sound, a text, or any other arbitrary information.

7-8. Others

The terminal device 100 may appropriately combine the above-described arbitrary processes and execute the display change process. This combination can be arbitrarily set by the advertiser when the advertisement content is registered in the advertisement delivery server 20. The advertisement delivery server 20 generates control information for causing the terminal device 100 to execute a combination of processes set by the advertiser, and delivers the generated control information to the terminal device 100. As a result, the terminal device 100 can combine and execute the above-described arbitrary processes according to a setting performed by the advertiser.

8. Process Flow of Terminal Device 100

Figure 9:
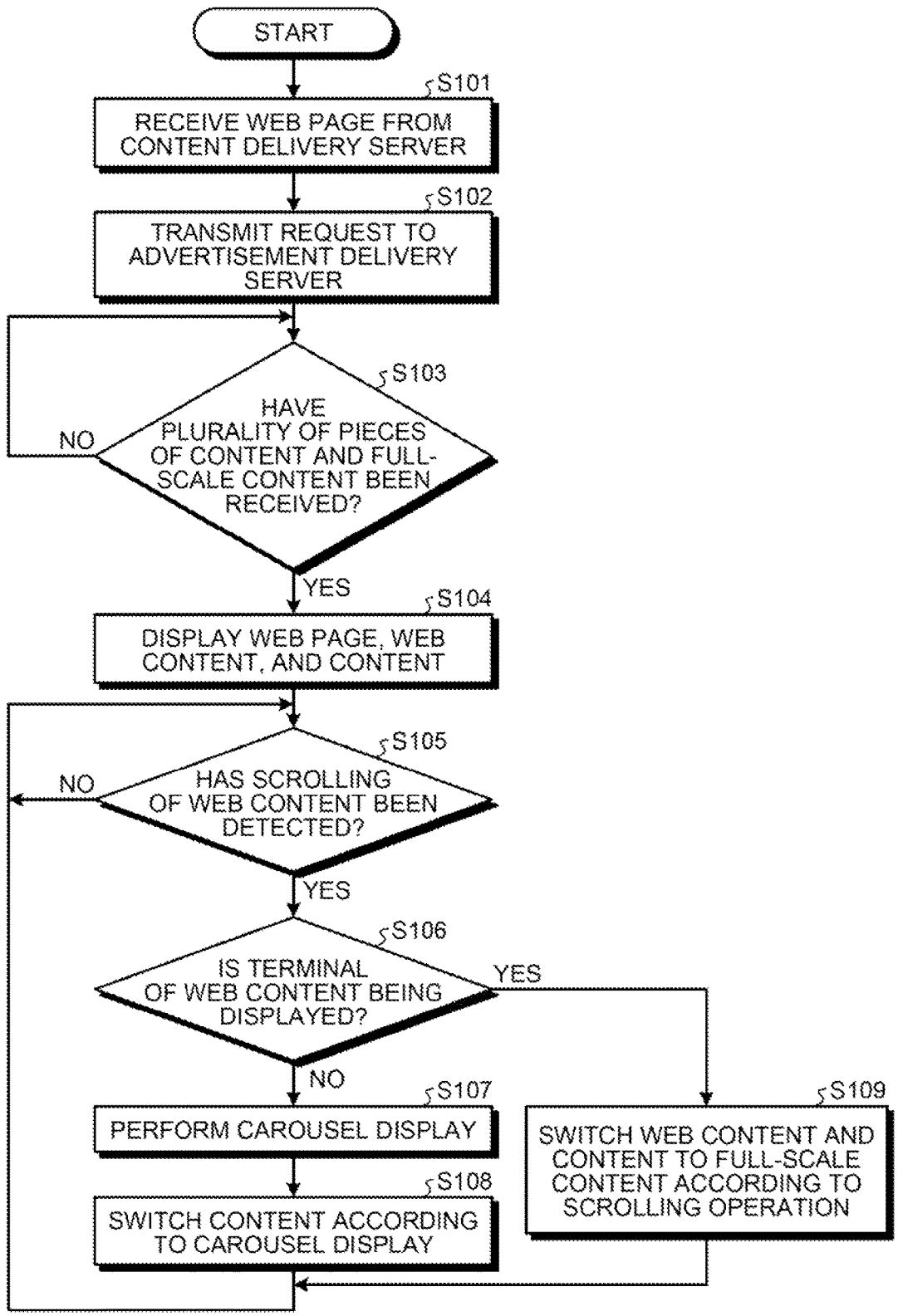
FIG. 9 is a flowchart illustrating an exemplary flow of a display change process executed by a terminal device according to an embodiment.

Next, a procedure of a process executed by the terminal device 100 that has executed the control information will be described with reference to FIG. 9. FIG. 9 is a flowchart illustrating an example of the flow of a display change process executed by a terminal device according to an embodiment. The following description will proceed with an exemplary flow of the display change process illustrated in FIG. 7.

In an example illustrated in FIG. 9, the terminal device 100 requests the content delivery server 30 to deliver the web page C10 according to the user's operation, and receives the web page C10 and the web content C30 from the content delivery server 30 (step S101). Then, when the acquisition command is included in the delivered web page C10, the terminal device 100 transmits the delivery request to the advertisement delivery server 20 (step S102). Then, the terminal device 100 determines whether or not a plurality of pieces of content C21 to C24 and the full-scale content C25 have been received (step S103). Then, when the plurality of pieces of content C21 to C24 and the full-scale content C25 have not been received (No in step S103), the terminal device 100 executes step S103 again.

Further, when the plurality of pieces of content C21 to C24 and the full-scale content C25 have been received (Yes in step S103), the terminal device 100 displays the web page C10, arranges the content C20 on the display region C12 in the superimposed manner, and arranges and displays the web content C30 on the display region C13 (step S104). Then, the terminal device 100 determines whether or not the scrolling operation on the web content C30 has been detected (step S105), and when the scrolling operation on the web content C30 has been detected (Yes in step S105), the terminal device 100 determines whether or not the terminal of web content, that is, the web content C34 is being displayed (step S106).

Then, when the terminal of the web content is not being displayed (No in step S106), the terminal device 100 performs the carousel display of moving the web content C30 (step S107), and switches the content according to the carousel display (step S108). For example, the terminal device 100 reduces the display region of the content C21 according to the boundary line between the web content C31 and the web content C32, and switches the content C21 displayed on the display region C12 to the content C22. Then, the terminal device 100 executes step S105.

On the other hand, when the terminal of the web content is being displayed (Yes in step S106), the terminal device 100 switches the web content C30 and the content C20 to the full-scale content C25 according to the scrolling operation (step S109). In other words, the terminal device 100 reduces the widths of the display regions C12 and C13 according to the scrolling operation, and displays the full-scale content C25 arranged on the back side. Then, the terminal device 100 executes step S105.

Further, when the scrolling operation on the web content C30 has not been detected (No in step S105), the terminal device 100 executes step S105 again. Further, when an operation of leaving the web page C10 is performed, for example, when the user selects a link set to the web page C10 or when a landing page is displayed, the terminal device 100 ends the process illustrated in FIG. 9.

9. Modified Example

In the above example, the exemplary display change process performed by the terminal device 100 has been described using the display form illustrated in FIG. 1 or 7. However, an embodiment is not limited to this example. A variation of the display change process executed by the terminal device 100 will be described below. The display change process which will be described below is implemented, for example, by controlling the display unit 154 through the change unit 156.

9-1. Delivery of Web Content

In the above example, the content delivery server 30 delivers the web content C30, but an embodiment is not limited to this example. For example, the content delivery server 30 delivers a URL of another delivery server that delivers the web content C30 to the terminal device 100. In this case, the terminal device 100 transmits a request of the web content C30 to another delivery server indicated by the notified URL, and the delivery server receives delivery of the generated web content C30. Then, the terminal device 100 may display the web content C30 received from the delivery server on the display region C13 included in the web page C10.

9-2. Type of Content

The terminal device 100 displays the content C20 related to an advertisement registered by the advertiser as the content C20. However, an embodiment is not limited to this example, and the terminal device can apply the display change process to arbitrary content. For example, the terminal device 100 can apply the display change process to arbitrary content such as a game or a web page for which the user's operation is received in addition to an advertisement. In further detail, the terminal device 100 may execute the display change process, for example, when a game is executed or when an interactive type of a web page generated by a technique such as a flash or a cascading style sheets (CSS) is displayed. As this process is performed, for example, the terminal device 100 can inspire the user to have an interest in hidden content by displaying part of content hidden on the back side of another content according to the scrolling operation and cause the user having an interest in the hidden content to feel information that is desired to be transferred to the user through hidden content by displaying a whole image of the hidden content.

9-3. Log

Here, the terminal device 100 may acquire a log of actually displayed content or content selected by the user. For example, when the user ends the display of the web page C10 without performing the scrolling operation on the web content C30, the terminal device 100 acquires a log indicating that the content C20 has not been browsed. On the other hand, when the user performs the scrolling operation on the web content C30 and changes the content C21 to the content C22, the terminal device 100 acquires a log indicating that the content C21 and the content C22 have been browsed. Further, the terminal device 100 acquires a log indicating content selected by the user.

As described above, the log acquired by the terminal device 100 serves as a useful log, for example, when the number of impressions or the CTR of each advertisement content is updated or when an advertising effect is reported to the advertiser. The log acquired by the terminal device 100 may be used for a change of content arranged on the landing page. For example, when the user selects the content C20, the terminal device 100 acquires the same landing page and notifies the server that delivers the landing page of selected content among the content C21 to C24. At this time, the server that delivers the landing page may specify content arranged on the landing page according to the content C21 to C24 selected by the user and instruct the terminal device 100 to arrange the specified content on the landing page.

9-4. Control Information

The terminal device 100 executes the display process using the control information that is delivered together with the content C20 through the advertisement delivery server 20. However, an embodiment is not limited to this example. For example, the terminal device 100 receives the control information from the content delivery server 30 together with the web page, and receives the control instruction from the advertisement delivery server 20 together with the content C20. The terminal device 100 may execute the control information received from the content delivery server 30 and execute the display change process according to the received control instruction.

The terminal device 100 may download an application of causing the terminal device 100 to execute the display process of the web page C10, the display change process, or the like in advance and then execute the above process by executing the application.

9-5. Device Configuration

The above embodiment has been described in connection with the example in which the delivery system 1 includes the advertisement delivery server 20 and the content delivery server 30, but the advertisement delivery server 20 and the content delivery server 30 may be formed as a single device. In this case, for example, the advertisement delivery server 20 illustrated in FIG. 3 includes the content storage unit 32, the receiving unit 34, and the delivering unit 35 illustrated in FIG. 5. Further, when the web page acquisition request is received from the terminal device 100, the advertisement delivery server 20 delivers a web page including no acquisition command to the terminal device 100 together with the advertisement content.

The above embodiment has been described in connection with the example in which the content C20 is delivered from the advertisement delivery server 20 to the terminal device 100, but the content delivery server 30 may acquire the content C20 from the advertisement delivery server 20. In this case, the request receiving unit 26 of the advertisement delivery server 20 receives the acquisition request of the content C20 from the content delivery server 30. The advertisement delivery server 20 delivers the content C20 to the content delivery server 30. The content delivery server 30 delivers the web page including no acquisition command to the terminal device 100 together with the acquired content C20 from the advertisement delivery server 20.

9-6. Operation Record of Terminal Device

The terminal device 100 may transmit a record indicating how often the user has operated the terminal device 100 on the web page on which the content C20 according to an embodiment is arranged to the advertisement delivery server 20. Specifically, the terminal device 100 records the scrolling operation which the user performs on the web page C10 on which the content C20 is arranged, the scrolling operation on the web content C30, the user's selection operation, the position at which the content C20 is selected by the user, a display timing or the number of displays of selected content, the content C21 to C24, or the full-scale content C25, or the like.

Further, the terminal device 100 may record various kinds of operations which the user performs on the terminal device 100 such as a selection operation on the content C20 or the full-scale content C25, the number of times that the web page C10 is reloaded, or a signal origination operation (for example, writing in an SNS) from the terminal device on information specifying the content C20 or the full-scale content C25. The terminal device 100 transmits information related to an operation history to the advertisement delivery server 20.

In this case, the advertisement delivery server 20 collects the information related to the operation history delivered from the terminal device 100, and further acquires information obtained by analyzing this information. For example, the advertisement delivery server 20 acquires the number of scrolling operations, the number of times that the user performs the scrolling operation on the web content C30, and the display change process is executed, a type of a displayed landing page, a type of content arranged on a landing page, and information indicating a comparison of an index of an advertising effect such as a CTR for the content C20 including the control information according to an embodiment and the content C20 including no control information.

Here, an operation history on the web page C10 on which the content C20 including the control information according to an embodiment is displayed serves as an index indicating an advertising effect. In other words, in addition to the display of the previous web page (landing page) of the content C20 as the user clicks the content C20 in the web page on which the content C20 including the control information according to an embodiment is displayed, the operation history indicating how often the user has operated the web page C10 (that is, how often the user has changed the display form of the screen) can serve as an index indicating the user's interest in the content C20.

For example, the advertisement delivery server 20 can compare the number of times or a period of time that the content C20 is arranged within the screen as the user scrolls the web content C30, changes the content C20, and executes the display change process and provide an index indicating how much the user has an interest in information that is desired to be widely transferred through the content C20, that is, an advertisement when the content C20 including the control information according to an embodiment is displayed. Thus, the advertisement delivery server 20 can provide a report indicating an index of an advertising effect on the web page C10 on which the content C20 according to an embodiment is displayed by transmitting the information related to the operation history of the terminal device 100 to the advertiser terminal 10. Further, the advertisement delivery server 20 may transmit the information related to the operation history of the terminal device 100 to the advertiser terminal 10 without change.

Accordingly, the advertisement delivery server 20 can show the advertiser usefulness of the display form of the content C20 including the control information according to an embodiment in the terminal device 100.

9-7. Others

All or some processes described as being automatically performed among the processes described in above embodiment can be manually performed, and all or some processes described as being manually performed can be automatically performed by a known method. A process procedure, a specific name, and information including various kinds of pieces of data or parameters described in the above document or illustrated in the drawings can be arbitrarily changed unless set forth otherwise. For example, various kinds of pieces of information illustrated in the drawings are not limited to the illustrated information.

The components of the devices illustrated in the drawings are functional and conceptual and need not be necessarily configured physically as illustrated in the drawings. In other words, a specific form of distribution or integration of the respective devices is not limited to the illustrated form, and all or some of the devices can be distributed or integrated functionally or physically in arbitrary units according to various kinds of loads or use situations. For example, the requesting unit 151 and the operation control unit 152 illustrated in FIG. 6 may be integrated.

The above embodiments can be appropriately combined as long as processing content is not contradicted.

9-8. Program

Figure 10:
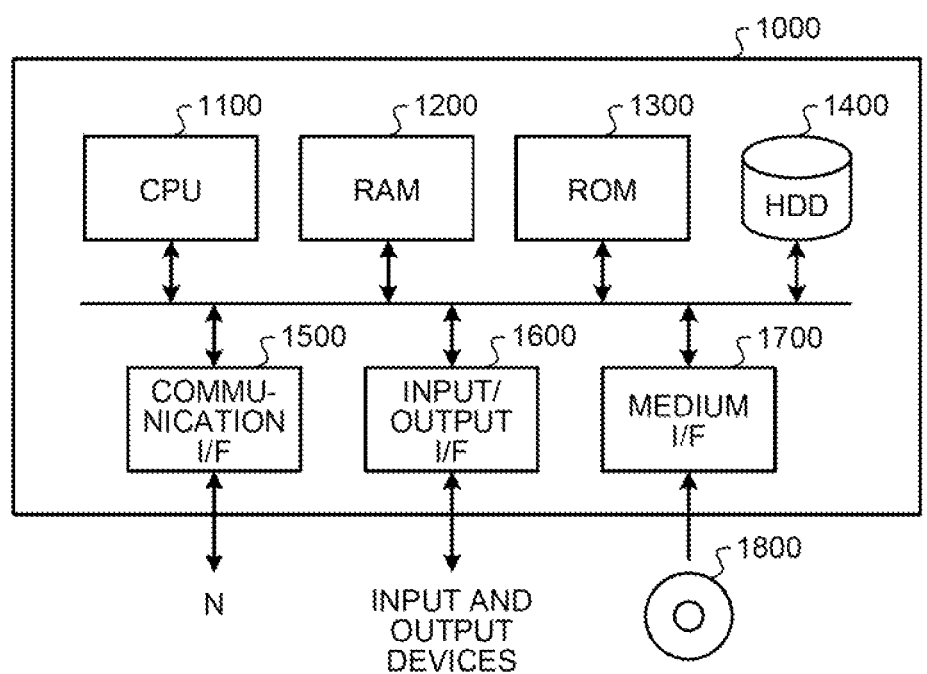
FIG. 10 is a hardware configuration diagram illustrating an exemplary computer that implements a function of an advertisement delivery server.

The terminal device 100, the advertisement delivery server 20, and the content delivery server 30 according to the above embodiment are implemented, for example, by a computer 1000 having a configuration illustrated in FIG. 10. The following description will proceed with an example of the advertisement delivery server 20. FIG. 10 is a hardware configuration diagram illustrating an exemplary computer that implements the function of the advertisement delivery server. The computer 1000 includes a CPU 1100, a RAM 1200, a ROM 1300, an HOD 1400, a communication interface (I/F) 1500, an input/output interface (I/F) 1600, and a medium interface (I/F) 1700.

The CPU 1100 operates based on a program stored in the ROM 1300 or the HDD 1400, and controls the respective units. The ROM 1300 stores a boot program that is executed by the CPU 1100 when the computer 1000 is activated, a program depending on hardware of the computer 1000, and the like.

The HDD 1400 stores a program that is executed by the CPU 1100, data used by a relevant program, and the like. The communication interface 1500 receives data from another device via the network N, transfers the received data to the CPU 1100, and transmits data generated by the CPU 1100 to another device.

The CPU 1100 controls an output device such as a display or a printer and an input device such as a keyboard or a mouse through the input/output interface 1600. The CPU 1100 acquires data from the input device through the input/output interface 1600. The CPU 1100 outputs the generated data to the output device through the input/output interface 1600.

The medium interface 1700 reads a program or data stored in a recording medium 1800, and provides the read program or data to the CPU 1100 via the RAM 1200. The CPU 1100 loads a relevant program from the recording medium 1800 onto the RAM 1200 through the medium interface 1700, and executes the loaded program. Examples of the recording medium 1800 include an optical recording medium such as a digital versatile disc (DVD) or a phase change rewritable disk (PD), a magneto optical recording medium such as a magneto-optical disk (MO), a tape medium, a magnetic recording medium, and a semiconductor memory.

For example, when the computer 1000 functions as the advertisement delivery server 20 according to the embodiment, the CPU 1100 of the computer 1000 executes the program loaded onto the RAM 1200, and implements the function of the control unit 23. The HDD 1400 stores data of the storage unit 22, that is, the advertisement database 24. The CPU 1100 of the computer 1000 reads the program from the recording medium 1800 and executes the read program, but as another example may acquire the program from another device.

Further, when the computer 1000 functions as the terminal device 100 according to the embodiment, the CPU 1100 of the computer 1000 executes the program loaded onto the RAM 1200, and implements the function of the control unit 150.

Further, when the computer 1000 functions as the content delivery server 30 according to the embodiment, the CPU 1100 of the computer 1000 executes the program loaded onto the RAM 1200, and implements the function of the control unit 33. The HDD 1400 stores data of the content storage unit 32.

10. Effect

The terminal device 100 displays the web content C30 and the content C21 side by side as described above. The terminal device 100 changes the display range of the web content C30 and changes the content C21 to the content C22 according to the scrolling operation of changing the display range serving as the range in which the web content C30 is displayed on the screen.

Thus, the terminal device 100 can improve the appeal of information related to the content C20 such as information that is desired to be transferred to the user through the content C20. In other words, when the user performs the operation of scrolling the web content C30, the terminal device 100 scrolls the web content C30, and changes the content C20 that does not undergo the scrolling operation according to the scrolling operation on the web content C30. Thus, the terminal device 100 can cause the user to be aware of the content C20. As a result, the terminal device 100 inspires the user to have an interest in the content C20, and thus the appeal of information related to the content C20 can be improved.

In further detail, when the advertisement content related to an advertisement is displayed, the terminal device 100 can inspire the user to have an interest in the advertisement content, and thus the advertising effect can be improved as a result of improving the appeal of information that is desired to be transferred through the advertisement content.

Further, the terminal device 100 scrolls the web content C30 according to the scrolling operation in the display region C13, and changes the content C21 to the content C22. In other words, when the user performs the operation of scrolling the web content C30, the terminal device 100 not only moves the web content C30 but also changes the content C20. Thus, the terminal device 100 can improve the appeal of information related to the content C20 as a result of inspiring the user to have an interest in the content C20.

Further, the terminal device 100 displays the content C21 on the display region C12, and reduces the ratio of the display region of the content C21 in the display region C12 and increases the ratio of the display region of the content C22 in the display region C12 according to the scrolling operation on the web content C30. Thus, the terminal device 100 can change the content C20 in a complicated form in which the content C21 displayed on the display region C12 is steadily changed to the content C22 as the web content C30 is scrolled. As a result, the terminal device 100 can improve the appeal of information related to the content C20. Further, the terminal device 100 can change the content C20 in a different form from the web content C30 and thus can inspire the user to have an interest in the content C20 and improve the appeal of information related to the content C20.

The terminal device 100 moves the content C22 arranged in front of the content C21 to the inside of the display region C12 without moving the content C21. Thus, the terminal device 100 changes the content C20 in a complicated form in which the content C22 sweeps onto the front surface of the content C21, and thus it is possible to inspire an interest in the content C20.

The terminal device 100 arranges the content C22 on the back side of the content C21, and reduces the width of the display region of the content C21 and increases the width of the display region of the content C22 according to the scrolling operation. Thus, for example, the terminal device 100 changes the content C20 in a complicated form in which the content C22 arranged on the back side of the content C21 appears according to the scrolling operation, and thus it is possible to inspire an interest in the content C20.

The terminal device 100 scrolls the web content C30 according to the scrolling operation on the web content C30, and moves the boundary between the display region of the content C21 and the display region of the content C22 as the web content C30 is scrolled.

The terminal device 100 displays the web content C30 including a predetermined frame border, and moves the boundary between the display region of the content C21 and the display region of the content C22 as the frame border included in the web content C30 is moved.

Through the above process, the terminal device 100 can provide the user with an operational feeling in which the change of the content C20 is controlled through the scrolling operation of the web content C30. As a result, the terminal device 100 can inspire the user to have an interest in the content C20 and improve the appeal of information related to the content C20.

Further, when the scrolling operation is performed while the web content C34 is being displayed, the terminal device 100 causes the full-scale content C25 to be displayed on the display regions C12 and C13 according to the scrolling operation. Thus, the terminal device 100 causes the full-scale content C25 having the larger display size than the content C20 to be displayed on the screen according to the scrolling operation and thus can improve the appeal of information related to the content C20 or the full-scale content C25.

The terminal device 100 reduces the widths of the display regions C12 and C13 and increases the width of the region on which the full-scale content C25 is displayed according to the scrolling operation on the web content C34. Thus, for example, the terminal device 100 steadily displays the full-scale content C25 according to the scrolling operation and thus can provide a feeling about information related to the full-scale content C25.

The terminal device 100 moves the full-scale content C25 arranged in front of the content C24 and the web content C34 from the outside of the display region C11 to the inside of the display region C11 according to the scrolling operation without moving the content C24. Thus, for example, the terminal device 100 displays the full-scale content C25 in a complicated form in which the full-scale content C25 sweeps onto the front surface of the content C24 and the web content C34 and thus can provide a feeling about information related to the full-scale content C25.

The terminal device 100 arranges the full-scale content C25 on the back side of the display regions C12 and C13, and reduces the widths of the display regions C12 and C13 and increases the width of the display region of the full-scale content C25 according to the scrolling operation. Thus, for example, the terminal device 100 displays the full-scale content C25 in a complicated form in which the full-scale content C25 hidden on the back side of the display regions C12 and C13 is displayed, and thus can provide a feeling about information related to the full-scale content C25.

Further, when the web content C34 located at the terminal of the web content C30 is displayed, the terminal device 100 causes the content C24 serving as the same content as the range corresponding to the display region C12 in the full-scale content C25 to be displayed on the display region C12. As a result, the terminal device 100 can cause the user to feel that the full-scale content C25 is displayed in a complicated display form in which the display region C12 enters the transmission state, and then the frame border disappears with the movement of the web content C34. Thus, the terminal device 100 can provide a feeling about information that is desired to be transferred through the content C20 and the full-scale content C25.

The terminal device 100 displays the content C41 to C43 including the moving image, and controls reproduction of the moving images included in the content C41 to C43 according to the scrolling operation. Thus, the terminal device 100 can cause the user to feel information that is desired to be transferred through the content C41 to C43.

The terminal device 100 arranges the content C44 and C45 in front of the web content C30 or the content C41 to C43, and displays the content C44 and C45 at the position according to the scrolling operation. Thus, for example, as a result of inspiring the user to have an interest more strongly, the terminal device 100 can cause the user to feel information that is desired to be transferred through the content C44 and C45 more strongly.

The terminal device 100 displays the content C44 to C46 including the moving image, and controls reproduction of the moving images included in the content C44 to C46 according to the scrolling operation. Thus, as a result of inspiring the user to have an interest more strongly, the terminal device 100 can cause the user to feel information that is desired to be transferred through the content C44 to C46 more strongly.

The embodiments of the present application have been described in detail with reference to the drawings, but the above embodiments are examples, and the present invention can be implemented in other forms in which various modifications or improvements are performed based on knowledge of those having skill in the art starting from the form described in the section of the disclosure of the invention.

Further, a "unit (a section, a module, or a unit)" described above can be interpreted as a "means," a "circuit," or the like. For example, the delivering unit can be interpreted as a delivering means or a delivering circuit.

According to an aspect of an embodiment, an effect in which the appeal of information related to content can be improved is obtained.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information display device comprising:
   a processor programmed to:
   display a part of a first content on a first display region and a second content on a second display region, the first display region and the second display region are arranged side by side in a display;
   according to a change operation of changing the part of the first content displayed on the first display region, move the first content displayed on the first display region; and
   simultaneously with the moving of the first content displayed on the first display region, transition the second content to a third content displayed on the second display region by reducing a ratio of a region in which the second content is displayed in the second display region and increasing a ratio of a region in which the third content is displayed in the second display region according to the change operation without moving the second content.

2. The information display device according to claim 1, wherein the processor is programmed to change the display of the first part of the first content and change the second content to the third content according to the change operation occurring in a region of the display in which the first part of the first content is displayed.

3. The information display device according to claim 1, wherein the processor is programmed to:
   display the second content in a predetermined display region.

4. The information display device according to claim 3, wherein the processor is programmed to move the third content arranged in front of the second content from an outside of the predetermined display region to an inside of the predetermined display region according to the change operation, without moving the second content.

5. The information display device according to claim 3, wherein the processor is programmed to:
   arrange the third content on a layer of the display that is behind a layer of the display on which the second content is arranged; and
   reduce a width of the region in which the second content is displayed in the display and increase a width of the region in which the third content is displayed in the display according to the change operation.

6. The information display device according to claim 3, wherein the processor is programmed to move the display of the first content according to the change operation, and move a boundary between the region in which the second content is displayed in the display and the region in which the third content is displayed in the display with movement of the display.

7. The information display device according to claim 6, wherein the processor is programmed to:
   display the first content including a predetermined frame border; and
   move the boundary between the region in which the second content is displayed in the display and the region in which the third content is displayed in the display with movement of the frame border included in the first content.

8. The information display device according to claim 1, wherein when the change operation is performed while a terminal of the first content is being displayed, the processor is programmed to display a fourth content on a region in which the first content is displayed and a region in which the second content is displayed, according to the change operation.

9. The information display device according to claim 8, wherein the processor is programmed to reduce a width of the region in which the first content is displayed and a width of the region in which the second content is displayed, and increase a width of a region in which the fourth content is displayed, according to the change operation.

10. The information display device according to claim 9, wherein the processor is programmed to move the fourth content arranged in front of the first content and the second content from an outside of a region including the region in which the first content is displayed and the region in which the second content is displayed to an inside of the region according to the change operation, without moving the second content.

11. The information display device according to claim 9, wherein the processor is programmed to:
    arrange the fourth content on a layer of the display that is behind a layer of the display including the region in which the first content is displayed and the region in which the second content is displayed; and
    reduce a width of the region including the region in which the first content is displayed and the region in which the second content is displayed and increase a width of the region in which the fourth content is displayed, according to the change operation.

12. The information display device according to claim 11, wherein when the first content is displayed in the region in which the first content is displayed, the processor is programmed to display the fourth content at a same position as the region in which the second content is displayed.

13. The information display device according to claim 1, wherein the processor is programmed to:
    display the second content or the third content including a moving image; and
    control reproduction of the moving image included in the second content or the moving image included in the third content, according to the change operation.

14. The information display device according to claim 1, wherein the processor is programmed to arrange a fifth content in front of the first content or the third content, and display the fifth content at a position according to the change operation.

15. The information display device according to claim 14, wherein the processor is programmed to display the fifth content including a moving image, and control reproduction of the moving image included in the fifth content according to the change operation.

16. A delivery device comprising:
    a processor programmed to deliver second content and third content displayed with first content to a terminal device together with control information, the control information causing the terminal device to execute:
    a display process of displaying a part of the first content on a first display region and the second content on a second display region, the first display region and the second display region are arranged side by side in a display; and
    a change process of according to a change operation of changing the part of the first content displayed on the first display region, moving the first content displayed on the first display region, and simultaneously with the moving of the first content displayed on the first display region, transitioning the second content to the third content displayed on the second display region by reducing a ratio of a region in which the second content is displayed in the second display region and increasing a ratio of a region in which the third content is displayed in the second display region according to the change operation without moving the second content.

17. An information display method executed by an information display device, the information display method comprising:
    a display step of displaying a part of a first content on a first display region and a second content on a second display region, the first display region and the second display region are arranged side by side in a display; and
    a change step of according to a change operation of changing the part of the first content displayed on the first display region, moving the first content displayed on the first display region, and simultaneously with the moving of the first content displayed on the first display region, transitioning the second content to a third content displayed on the second display region by reducing a ratio of a region in which the second content is displayed in the second display region and increasing a ratio of a region in which the third content is displayed in the second display region according to the change operation without moving the second content.

18. A non-transitory computer readable storage medium having stored therein an information display program causing a computer to execute a process, the process comprising:
    a display process of displaying a part of a first content on a first display region and a second content on a second display region, the first display region and the second display region are arranged side by side in a display; and
    a change process of according to a change operation of changing the part of the first content displayed on the first display region, moving the first content displayed on the first display region, and simultaneously with the moving of the first content displayed on the first display region, transitioning the second content to a third content displayed on the second display region by reducing a ratio of a region in which the second content is displayed in the second display region and increasing a ratio of a region in which the third content is displayed in the second display region according to the change operation without moving the second content.

* * * * *